(12) United States Patent
Sardera

(10) Patent No.: US 8,107,786 B2
(45) Date of Patent: Jan. 31, 2012

(54) SYSTEMS AND METHODS TO MODIFY PLAYOUT OR PLAYBACK

(75) Inventor: Esteban Sardera, San Francisco, CA (US)

(73) Assignee: Open TV, Inc., San Francisco, CA (US)

(*) Notice: Subject to any disclaimer, the term of this patent is extended or adjusted under 35 U.S.C. 154(b) by 1436 days.

(21) Appl. No.: 11/469,195

(22) Filed: Aug. 31, 2006

(65) Prior Publication Data

US 2008/0124052 A1    May 29, 2008

(51) Int. Cl.
*H04N 5/935* (2006.01)

(52) U.S. Cl. ........ 386/205; 386/203; 386/344; 386/350; 386/286; 386/343

(58) Field of Classification Search .................. 386/205, 386/203, 343, 344, 350, 286
See application file for complete search history.

(56) References Cited

U.S. PATENT DOCUMENTS

| | | | |
|---|---|---|---|
| 6,028,726 A | 2/2000 | Yanagihara | |
| 6,041,067 A * | 3/2000 | Takamori et al. | 370/514 |
| 7,245,664 B1 * | 7/2007 | Ohnami | 375/240.28 |
| 7,379,463 B2 * | 5/2008 | Tomita | 370/395.64 |

FOREIGN PATENT DOCUMENTS

| | | |
|---|---|---|
| EP | 1553598 A2 | 7/2005 |
| WO | WO-2005029836 A2 | 3/2005 |

OTHER PUBLICATIONS

"European Application Serial No. 07115246.6 office action mailed Oct. 27, 2009", 3 pgs.
"FX to test new ad to combat DVR viewers", [Online]. Retrieved from the Internet: <URL: http://news.com.com/FX+to+test+new+ad+to+combat+DVR+viewers/2100-1024_3-6116143.html?tag=nefd.top>, (Sep. 15, 2006).

* cited by examiner

*Primary Examiner* — Helen Shibru
(74) *Attorney, Agent, or Firm* — Schwegman, Lundberg & Woessner, P.A.

(57) ABSTRACT

Systems and methods to modify playout or playback include a first and second approach to respond to a trick mode request (e.g., fast forward, rewind). First, a trick mode request may be responded to by associating primary content to secondary content and playing out the secondary content on a receiving device, the secondary content not being derived from the primary content. Second, a trick mode request may be responded to by associating primary content to secondary content and playing out the secondary content on a receiving device, the secondary content being derived from the primary content but played at a normal speed for the secondary content.

7 Claims, 21 Drawing Sheets

SYSTEMS AND METHODS TO MODIFY PLAYOUT OR PLAYBACK

FIELD

Embodiments relate generally to the technical field of communications and more specifically to systems and methods to modify playout or playback of primary content.

BACKGROUND

Many receiving devices such as personal video recorders (PVRs) or digital video recorders (DVRs) may provide support for trick mode requests that enable a user to fast forward or rewind content (e.g. primary content). For example, a user who has recorded a movie on a PVR may fast forward through a scene while playing the movie. In response to the request, the PVR may render the movie to a display device at an accelerated speed. Two disadvantages may be identified in processing the users request to fast forward. First, the content played out in response to the fast forward request is the same content, nevertheless played at an accelerated speed. Second, the content played out in response to the fast forward request may appear jerky and reproduce poorly making identification of scenes difficult.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
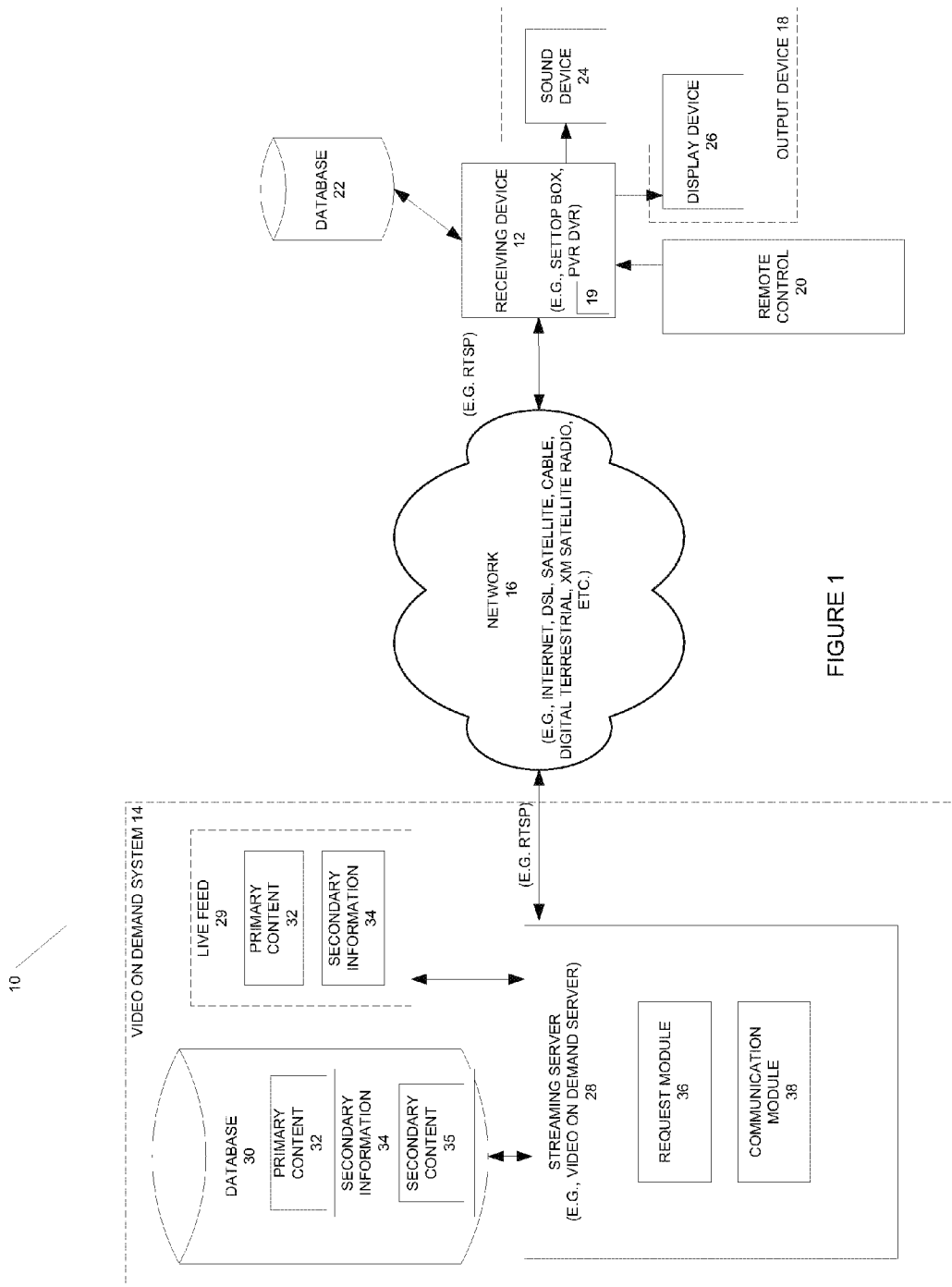
FIG. 1 is a block diagram illustrating a system, according to an example embodiment, to modify playout of primary content.

In the following description, for purposes of explanation, numerous specific details are set forth in order to provide a thorough understanding of example embodiments of the present invention. It will be evident, however, to one skilled in the art that the present invention may be practiced without these specific details.

Embodiments described below use one of two approaches to respond to a trick mode request (e.g., fast forward, rewind, skip request). First, a trick mode request may be responded to by associating primary content to secondary content and playing out the secondary content on a receiving device, the secondary content not being derived from the primary content. For example, a user viewing a movie (e.g., primary content) may select a fast forward button that causes fast forwarding of the movie; however, instead of viewing the movie at an accelerated speed, the user may view and/or hear secondary content. Taking this approach, the author of the secondary content is empowered with complete editorial control over the secondary content. Accordingly, the author may create secondary content of the same subject matter as the primary content or create secondary content of a different subject matter altogether. Further, the author may create secondary content of the same medium (e.g., audio and/or video)

and presentation (e.g., full motion and/or slide show) of the primary content or create secondary content of a different medium (e.g., audio and/or video) and presentation (e.g., full motion and/or slide show). In addition, the author of the primary content need not be the author of the secondary content or be legally or otherwise related to the author of the secondary content.

Second, a trick mode request may be responded to by associating primary content to secondary content and playing out the secondary content on a receiving device, the secondary content being derived from the primary content but played at a normal speed for the secondary content. Taking this approach, the author of the secondary content is empowered with limited editorial control over the secondary content because the secondary content is derived from the primary content. For example, the derivative secondary content may include selected samples (e.g., audio and/or visual; motion and/or slide show) from the associated primary content. Further, the secondary content may be played at a normal speed for the secondary content thereby eliminating the jerkiness and poor reproduction normally associated with rendering primary content that is fast forwarded or rewound.

DEFINITIONS

Primary Content in this document is intended to include content that may be played on a receiving device or interacted with on a receiving device. Primary content may include but is not limited to entertainment content and advertisement content. Further, primary content may include video content and/or audio content and/or associated metadata.

Secondary Content in this document is intended to include content that may be substituted for primary content responsive to receipt of a trick mode request (e.g., fast forward, rewind, reverse, etc.). The secondary content may be played or interacted with on a receiving device. Further, secondary content may include video content and/or audio content and/or associated metadata.

Secondary Information in this document may include secondary content, information to generate secondary content or information to access secondary content.

Derivative Secondary Content in this document is intended to include secondary content that is generated from the associated primary content. For example, derivative secondary content may include samples (e.g., audio and/or visual) from the associated primary content.

Non-Derivative Secondary Content in this document is intended to include secondary content that is not generated from the associated primary content. For example, derivative secondary content does not include samples (e.g., audio and/or visual) from the associated primary content.

Normal Speed in this document is intended to include an instantaneous speed to render a discrete unit of content (e.g., primary content or secondary content) to an output device, the normal speed being the speed necessary to completely render the discrete unit of content from beginning to end in a predetermined play time that is associated with the content. For example, an episode of Gilligan's Island may be rendered at a receiving device at a normal speed such that the episode completes in a predetermined running time (e.g., play time) of twenty-five minutes. Play times may be published with the primary and secondary content. For example, movies may be stored on media and labeled with the play time of the movie. A normal speed may be applicable to advancing the discrete unit of content in forward or reverse directions.

Accelerated Speed in this document is intended to include an instantaneous speed to render a discrete unit of content to an output device, the accelerated speed being any speed greater than the normal speed associated with the discrete unit of content. An accelerated speed may be applicable to advancing the discrete unit of content in forward or reverse directions.

Point to Point Communications

This section describes aspects of the present disclosure that may be embodied using point to point communications. For example, point to point communications may be embodied as a receiving device that requests a video on demand asset from a video on demand server.

According to a first example aspect of the present disclosure a request for primary content may be received at a system. In response, the system may communicate the primary content to a receiving device that may render the primary content to an output device at a normal speed of the primary content. Also, in response, the system may associate primary content to secondary information that is communicated to a receiving device. Next, the receiving device may receive a request to render the primary content at the receiving device at an accelerated speed of the primary content (e.g., fast forward, rewind). In response, the receiving device may use the secondary information to render secondary non-derivative content to the output device instead of the primary content.

According to a second example aspect of the present disclosure processing is substantially similar as the first example aspect of the present disclosure except the secondary information may be used to render secondary derivative content instead of secondary non-derivate derivative content. Further, the receiving device may render the secondary derivative content at a normal speed for the secondary non-derivative content. For example, the secondary non-derivative content may include a full motion recording of selected scenes from the primary content.

Other embodiments of the first and second aspects may include the primary content being stored to a storage device at the receiving device before rendering to the output device, the secondary content being already generated at the time of the trick mode request, and the secondary content to be generated at the time of the trick mode request.

According to a third example aspect of the present disclosure a system receives a request for primary content. In response to the request, the system may communicate the primary content to a receiving device that renders the primary content to an output device at a normal speed of the primary content. Next, the system may receive a request from the receiving device to communicate the primary content for rendering at the output device at the receiving device at an accelerated speed of the primary content (e.g., fast forward, rewind). In response, the system may associate the primary content to secondary non-derivative content and communicate the secondary non-derivative content to the receiving device. Next, the receiving device may render the secondary non-derivative content to the output device.

According to a fourth example aspect of the present disclosure processing is substantially similar as the third example aspect of the present disclosure except the secondary derivative content may be utilized instead of secondary non-derivate derivative content. Further, the receiving device may render the secondary derivative content at a normal speed for the secondary derivative content.

Other embodiments of the third and fourth aspects may include the primary content being stored to a storage device at the receiving device before rendering to the output device, the secondary content being already generated at the time of the trick mode request, and the secondary content to be generated at the time of the trick mode request.

According to a fourth example aspect of the present disclosure a receiving device may receive a request for primary content. In response, the receiving device may render the primary content to an output device at the receiving device at a normal speed for the primary content. Next, the receiving device may receive a request to render the primary content to the output device at an accelerated speed for the primary content (e.g., fast forward, rewind). Next, the receiving device may receive a simulated primary content at the receiving device for render to the output device at the receiving device so as to simulate render of the primary content to the output device at the receiving device at an accelerated speed (e.g., fast forward, rewind). Next, the receiving device may generate secondary derivative content based on the simulated primary content. Finally, the receiving device may render the secondary derivative content to the output device instead of the simulated primary content. Further, the receiving device may render the secondary derivative content at a normal speed for the secondary derivative content.

Point to Multi-Point Communications

This section describes aspects of the present disclosure that may be embodied using point to multi-point communications. For example, point to multi-point communications may be embodied using an insertion system that transmits an Internet Protocol (IP) transport streams in Moving Picture Experts Group-two (MPEG-2) compression formats to multiple receiving devices (e.g., settop boxes).

According to a fifth example aspect of the present disclosure a receiving device receives a transmission that includes primary content and a secondary information identifier. The receiving device stores the transmission on a local storage device (e.g. Pause). Next, the receiving device may retrieve the transmission from the local storage device to render the primary content to an output device at the receiving device at a normal speed for the primary content (e.g., Play). Next, the receiving device may receive a request to render the primary content to an output device at the receiving device at an accelerated speed of the primary content (e.g., Fast forward, rewind). Next, the receiving device may associate the primary content to secondary non-derivative content based on the secondary information identifier. Finally, the receiving device may render the secondary non-derivative content to the receiving device.

According to a sixth example aspect of the present disclosure processing is substantially similar as the fifth example aspect of the present disclosure except the secondary derivative content may be utilized instead of secondary non-derivate derivative content. Further, the receiving device may render the secondary derivative content at a normal speed for the secondary non-derivative content.

Other embodiments of the fifth and sixth aspects may include the secondary content being already generated at the time of the trick mode request, the secondary content being generated responsive to the trick mode request, and the secondary content being retrieved from remote storage rather than local storage.

According to a seventh example aspect of the present disclosures a system generates a transmission that includes primary content and a secondary information identifier. Next, the system communicates the transmission to a receiving device that may process the transmission according the fifth aspect described above.

According to an eight example aspect of the present disclosures a system generates a transmission that includes primary content and a secondary information identifier. Next, the system communicates the transmission to a receiving device that may process the transmission according the sixth aspect described above.

FIG. 1 is a block diagram illustrating a system 10, according to an example embodiment. The system 10 is shown to include a receiving device 12, a video on demand system 14, and a network 16. The receiving device 12 may, for example, include a set top box (STB), a personal computer, an iPod, a personal video recorder (PVR) (e.g., analog or digital input), a personal digital recorder (PDR) (e.g., analog or digital input), a mobile phone, a portable media player, a game console or any other device capable of playing video and/or audio content. The receiving device 12 is shown to be coupled to an output device 18 and a database 22. In an example embodiment, the receiving device 12 may be operated or controlled with control buttons 19 or a remote control 20. The output device 18 may include a sound device 24 and a display device 26, however, it will be appreciated by those skilled in the art that the output device 18 may also include a machine device to communicate machine interface information (e.g., SGML) to a machine (e.g., client, server, peer to peer). The network 16 may be any network capable of communicating video and/or audio and may include the Internet, closed IP networks such as DSL or FTTH, digital broadcast satellite, cable, digital, terrestrial, analog and digital (satellite) radio, etc. and/or hybrid solutions combining one or more networking technologies.

The video on demand system 14 is shown to include a streaming server 28 a live feed 29, and a database 30. The database 30 that may be a source of prerecorded primary content 32 and secondary information 34 and the live feed 29 may be a source of live primary content 32 and live secondary information 34. The primary content 32 may be played on the output device 18 at the receiving device 12. The secondary information 34 may include entertainment secondary information and advertisement secondary information. The secondary information 34 may further include secondary content 35 that also may be played on the output device 18 at the receiving device 12. Other embodiments may include secondary information 34 that may be used to generate secondary content 35, as described further below.

The streaming server 28 includes a request module 36 and a communication module 38. The request module 36 may receive requests from the receiving device 12. For example, the request module 36 may receive a request to play primary content 32, a request to fast forward primary content 32, a request to rewind primary content 32, and a request to pause primary content 32. In one example embodiment, the streaming server 28 and the receiving device 12 may utilize the real time streaming protocol (RTSP) to communicate. In another example embodiment the streaming server 28 and the receiving device 12 may utilize the digital storage media command and control protocol (DSM-CC) to communicate.

The communication module 38 may respond to requests received by the receiving module 218. For example, the communication module 38 may respond by communicating primary content 32 to the receiving device 12, communicating a secondary information identifier to the receiving device 12, or communicating secondary content 35 to the receiving device 12.

While the system 10 shown in FIG. 1 employs a client-server architecture, the present disclosure is of course not limited to such an architecture, and could equally well find application in a distributed, or peer-to-peer, architecture system. The request module 36 and communication module 38 may also be implemented as standalone software programs, which do not necessarily have networking capabilities.

Figure 2:
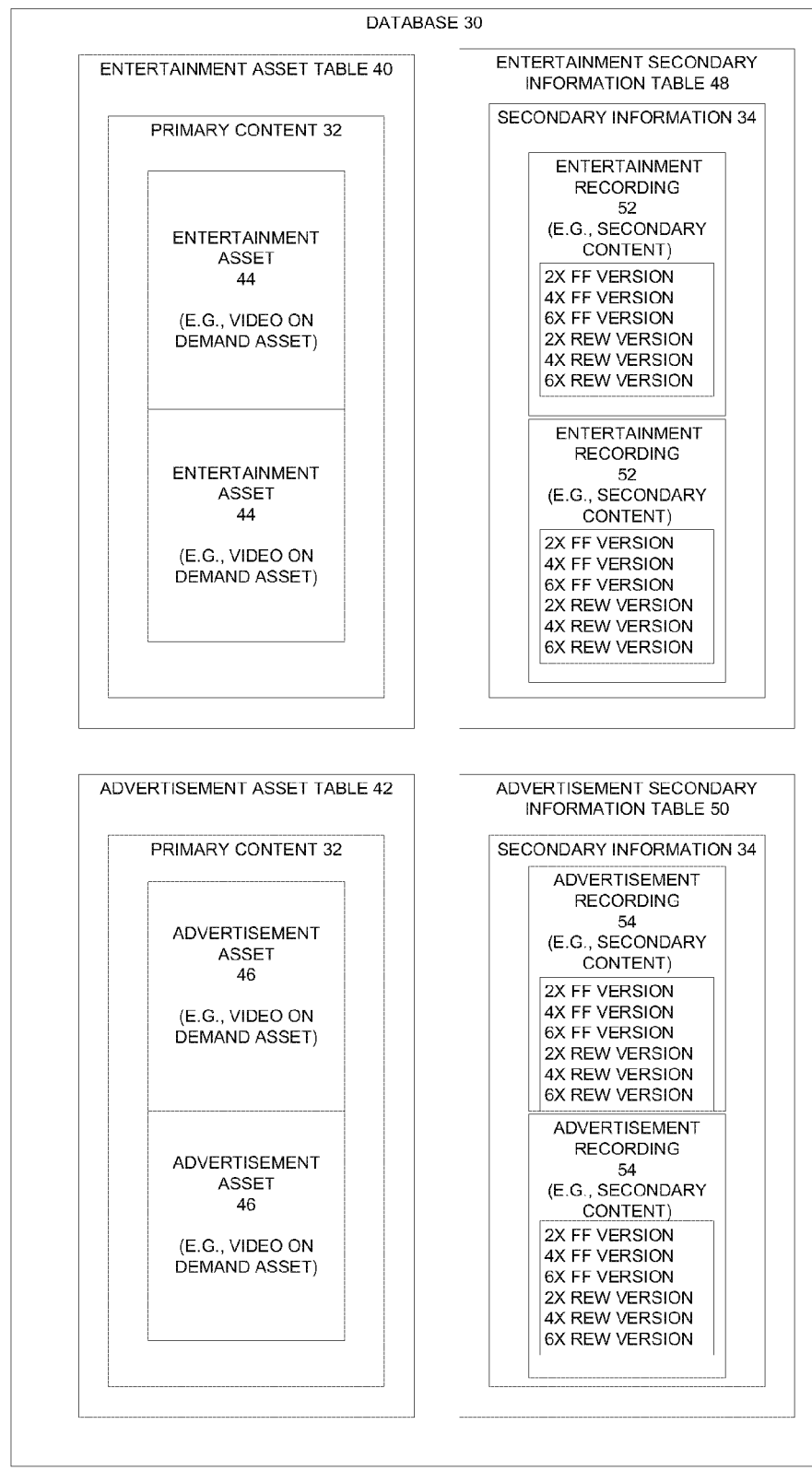
FIG. 2 is a block diagram illustrating a database, according to an example embodiment.

FIG. 2 is a block diagram illustrating a database 30, according to an example embodiment. The database 30 is shown to include an entertainment asset table 40, and advertisement asset table 42, an entertainment secondary information table 48, and an advertisement secondary information table 50. The entertainment asset table 40 includes primary content 32 in the form of entertainment assets 44 (e.g., video on demand assets). The entertainment asset 44 may be embodied as an audio/video asset such as a movie, television program such as a documentary, a biography, a cartoon, a program, music, or music video or an audio asset such as music track, audio interview or news program or any other form of entertainment that may be requested from the receiving device 12. A particular entertainment asset 44 may be accessed in the entertainment asset table 40 with an entertainment asset identifier.

The advertisement asset table 42 includes primary content 32 in the form of advertisement assets 46 (e.g., video on demand assets). For example, the advertisement asset 46 may be embodied as a commercial, a public service announcement, an infomercial or any other form of advertisement. A particular advertisement asset 46 may be accessed in the advertisement asset table 42 with an advertisement asset identifier.

The entertainment secondary information table 48 includes secondary information 34 that includes secondary content 35 that may be embodied as an entertainment recording 52. For example, the entertainment recording 52 may include key scenes from a movie that may be presented in frill motion with sound thereby enabling the user to easily identify where the user wishes to resume play. The entertainment secondary information table 48 may include multiple entertainment recordings 52 that respectively correspond to entertainment assets 44 in the entertainment asset table 40. Accordingly, a specific entertainment asset 44 may be associated to a corresponding secondary information 34 (e.g., entertainment recording 52) in the entertainment secondary information table 48.

The advertisement secondary information table 50 includes secondary information 34 in the form of secondary content 35 the may be embodied as an advertisement recording 54. For example, the advertisement recording 54 may include an abbreviated form of the frill length advertisement asset 46. The advertisement secondary information table 50 may include multiple advertisement recordings 54 that respectively correspond to advertisement assets 46 in the advertisement asset table 42. Accordingly, a specific advertisement asset 46 may be associated to a corresponding secondary information 34 (e.g., advertisement recording 54) in the advertisement secondary information table 50.

The entertainment recordings 52 and the advertisement recordings 54 are respectively shown to include six versions that correspond to types of trick mode requests to fast forward or reverse (e.g., rewind) primary content 32. Further the trick mode may specify an accelerated speed to fast forward or rewind the primary content 32. For example, the request to fast forward or rewind may be twice-times (e.g., 2x), four-times (e.g., 4x) and six-times (e.g., 6x) of the normal speed at which the primary content 32 is rendered to the output device 18. Other example embodiments may include additional or fewer versions.

The various versions may correspond to secondary content 35 that has play times of different duration. For example, secondary content 35 corresponding to twice-times (e.g., 2x), a four-times (e.g., 4x), and six-times (e.g., 6x) may have play times of 10, 5, and 2 seconds, respectively. Further, it will be appreciated by a person having ordinary skill in the art that the above described secondary content 35 may be designed to be played at normal speed or at any speed within a range of speeds around the normal speed (e.g., accelerated speeds) to achieve a high quality play out.

In some embodiments, the primary content 32 and secondary content 35 may be accompanied with an interactive application that may result in a presentation to an end user that enables interaction with the user. For example, an entertainment asset 44 in the form of an episode of "American Idol" may include an interactive application that may cause a pop-up that enables an end user to cast a vote. The episode of "American Idol" may further be interleaved with advertisements assets 46 that may enable the voting to continue while the advertisement asset 46 is playing. Further, the entertainment asset 44 and the advertisement recording 54 may be respectively associated with secondary content 35 (e.g., an entertainment recording 52 and an advertisement recording 54) that may also include interactive applications that may also result in a presentation to an end user that has an interactive quality. For example, an entertainment recording 52 associated with the episode of "American Idol" may include an interactive application that causes a pop-up that presents a current tally of the previously described vote.

Figure 3:
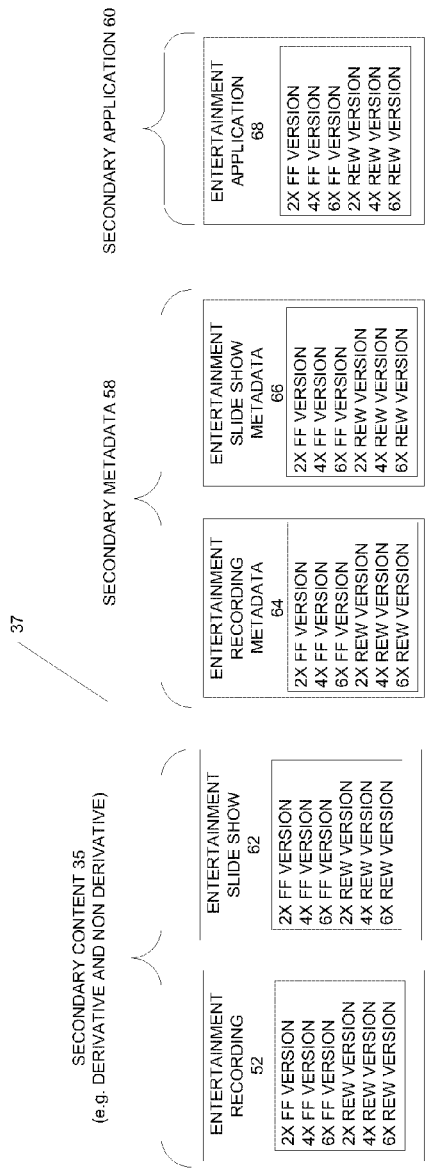
FIG. 3 is a block diagram illustrating example embodiments of entertainment secondary information, according to an example embodiment.

FIG. 3 is a block diagram illustrating example embodiments of entertainment secondary information 37. The entertainment secondary information 37 may include secondary content 35, secondary metadata 58 or a secondary application 60.

The secondary content 56 may be immediately rendered by the receiving device 12 to the output device 18 and may be embodied as the previously described entertainment recording 52 or an entertainment slide show 62. The entertainment slide show 62 may include one or more still images and sound that be rendered to the output device 18 at the receiving device 12. The still images may have video effects applied to them, including but not limited to fade-ins and fade-outs dissolves, splits, wipes, etc.

The secondary content 35 may include derivative secondary content and non-derivative secondary content. For example, the derivative secondary content may include samples (e.g., audio and/or visual) from the associated primary content. In contrast, the non-derivative secondary content does not include samples (e.g., audio and/or visual) from the associated primary content.

The secondary metadata 58 may be utilized to generate secondary content 35 (e.g., an entertainment recording 52 or an entertainment slide show 62). The secondary metadata 58 may be embodied as entertainment recording metadata 64 and an entertainment slide show metadata 66. The entertainment recording metadata 64 may be utilized by the communication module 38 or the receiving device 12 to generate the entertainment recording 52. In addition, the entertainment slide show metadata 66 may be utilized by the communication module 38 or the receiving device 12 to generate the entertainment slide show 62. For example, the communication module 38 or the receiving device 12 may utilize the metadata 72, 74 to identify and collect samples (e.g., audio, visual) from the associated primary content 32.

The secondary application 60 may be an application that may be executed by the communication module 38 or the receiving device 12 to generate secondary content 56. For example, the secondary application 60 may include an entertainment application 68 that may be executed by communication module 38 or the receiving device 12 to generate an entertainment recording 52 or an entertainment slide show 62.

The secondary content 35, secondary metadata 58, and the secondary application 60 may be prerecorded and stored on the database 30. Further, the secondary content 35 may be live (e.g., sporting events, election results, etc.) and communicated to the streaming server 28 from the live feed 29. Accordingly, the secondary information 34 received from the live feed 302 may include an entertainment recording 52 (e.g. live content), an entertainment slide show 62 (e.g. live content), an advertisement recording 54 (e.g. live content), and an advertisement slide show (e.g. live content).

Figure 4:
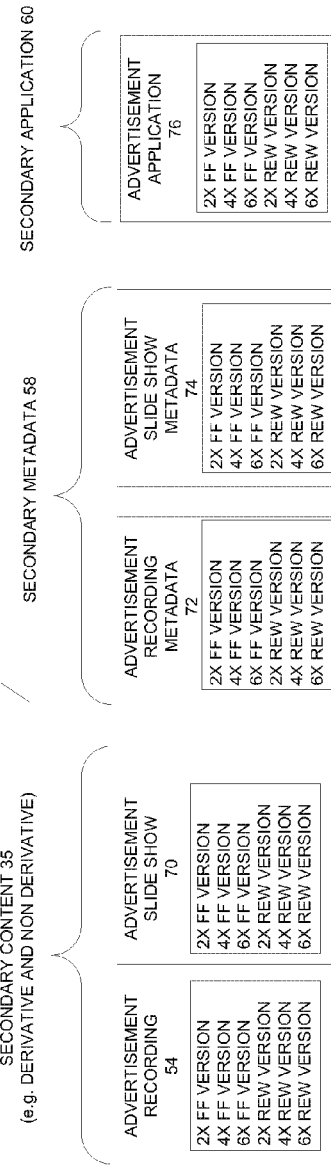
FIG. 4 is a block diagram illustrating example embodiments of advertisement secondary information.

FIG. 4 is a block diagram illustrating example embodiments of advertisement secondary information 39. The advertisement secondary information 39 may include secondary content 35, secondary metadata 58, or a secondary application 60.

The secondary content 56 may be immediately rendered by the receiving device 12 to the output device 18. The secondary content 56 may be embodied as the previously described advertisement recording 54 or an advertisement slide show 70. The advertisement slide show 70 may include one or more still images and sound that may be rendered to the output device 18 at the receiving device 12. The still images may have video effects applied to them, including but not limited to fade-ins and fade-outs dissolves, splits, wipes, etc.

The secondary content 35 may include derivative secondary content and non-derivative secondary content. For example, derivative secondary content may include samples (e.g., audio and/or visual) from the associated primary content. In contrast, non-derivative secondary content does not include samples (e.g., audio and/or visual) from the associated primary content 32.

The secondary metadata 58 may be utilized to generate secondary content 35 (e.g., advertisement recording 54 or an advertisement slide show 70). The secondary metadata 58 may be embodied as advertisement recording metadata 72 and an advertisement slide show metadata 66. The advertisement recording metadata 72 may be utilized by the communication module 38 or the receiving device 12 to generate secondary content 35 in the form of the advertisement recording 54. In addition, the advertisement slide show metadata 74 may be utilized by the communication module 38 or the receiving device 12 to generate secondary content 35 in the form of the advertisement slide show 70. For example, the communication module 38 or the receiving device 12 may utilize the metadata 72, 74 to identify and collect samples (e.g., audio, visual) from the associated primary content 32.

The secondary application 60 may be executed by the communication module 38 or the receiving device 12 to generate secondary content 56. For example, the secondary application 60 may include an advertisement application 68 that may be executed by communication module 38 or the receiving device 12 to generate an advertisement recording 54 or an advertisement slide show 70.

Figure 5:
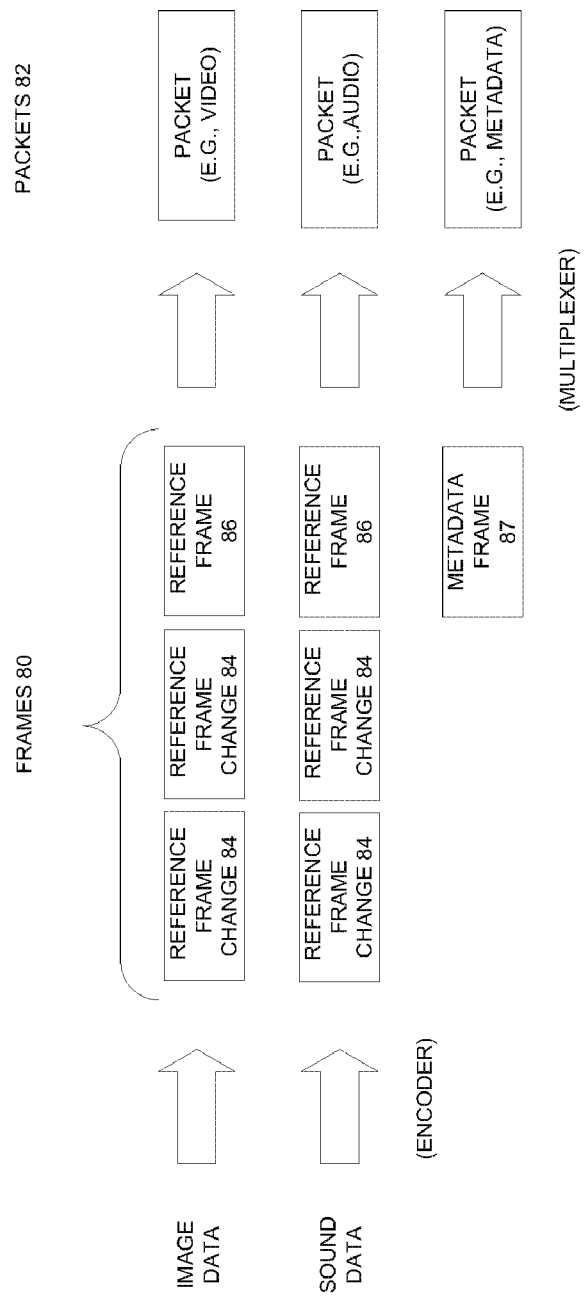
FIG. 5 is a block diagram illustrating frames and packets, according to an example embodiment.

FIG. 5 is a block diagram illustrating frames 80 and packets 82 according to an example embodiment. In an example embodiment the primary content 32 and the secondary information 34 may be stored as frames 80 on the database 30. In another example embodiment the primary content 32 and the secondary information 34 may be stored as packets 82 on the database 30.

Moving from left to right, analog image data and analog sound data may be encoded by an encoder to produce the frames 80. The frames 80 include reference frames 86, reference frame changes 84, and a metadata frame 87. The reference frame 86 may contain reference frame data that is sufficient to completely render an image on the display device 26. In contrast, the reference frame change 84 may contain reference frame change data representing the differences between two successive frames 80. The reference frame change 84 thereby enables bandwidth savings proportional to the similarity between the successive frames 80 (e.g., redundant information is not communicated). The metadata frame 87 contains metadata frame data that may be used to synchronize the corresponding image and sound data.

The reference frames 86, reference frame changes 84, and metadata frames 87 may further be packetized by a multiplexer into packets 82. The packets 82 are shown to include video information, audio information and metadata.

Figure 6:
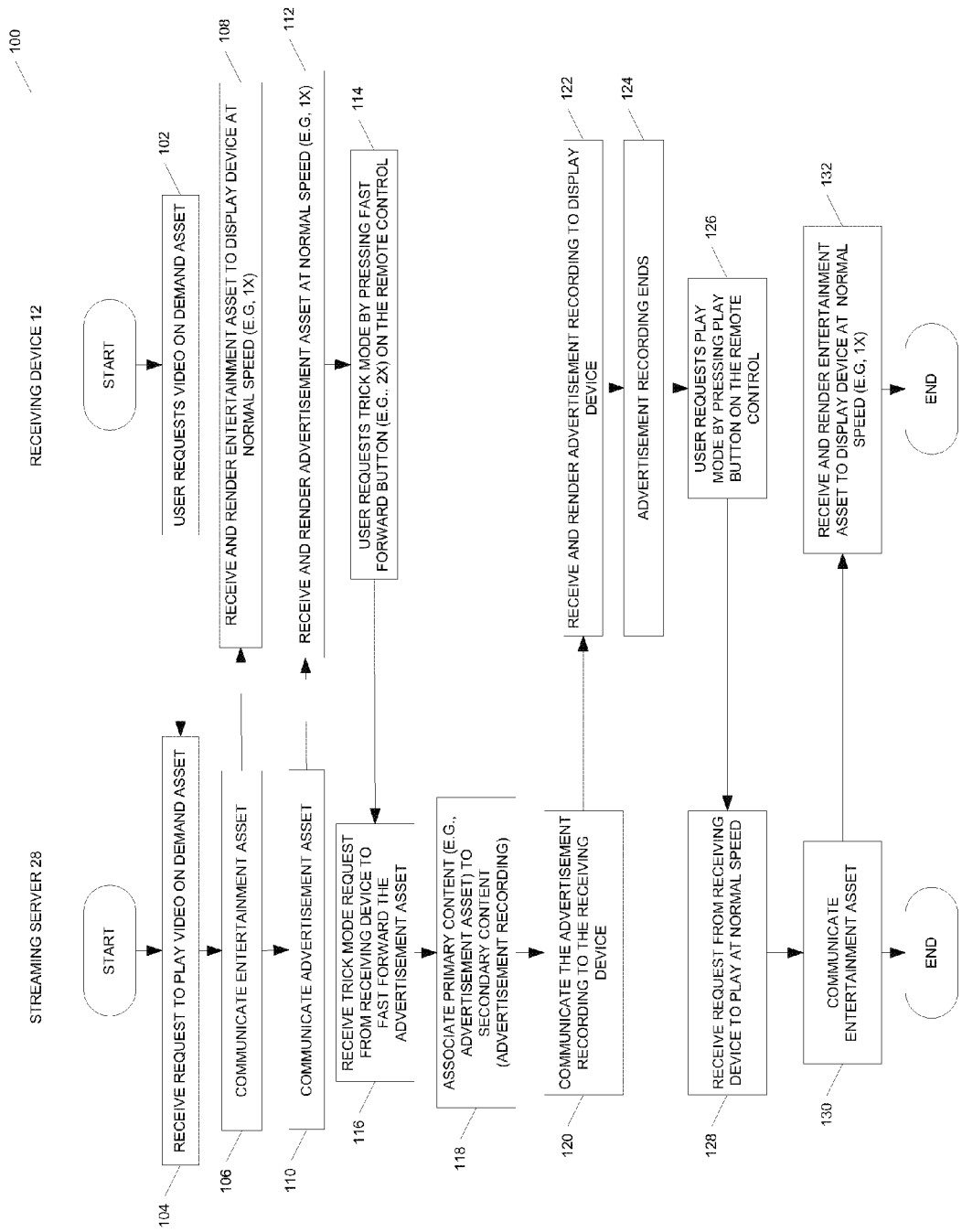
FIG. 6 is a flowchart illustrating a method, according to an example embodiment.

FIG. 6 is a flowchart illustrating a method 100, according to an example embodiment. Illustrated on the right are operations performed on the receiving device 12 and illustrated on the left are operations performed on the streaming server 28. The method 100 commences at the receiving device 12, at operation 102, with the user requesting an entertainment asset 44. For example, the user may use a remote control 20 to select a video on demand asset from a menu that is displayed on the display device 26. In response to the user's request, the receiving device 12 may communicate the request over the network 16 to the streaming server 28. In an example embodiment the receiving device 12 and the streaming server may utilize the real time streaming protocol (RTSP).

At operation 104, at the streaming server 28, the request module 36 receives the request to play the video on demand asset. For example, the request may include a primary content identifier that may be used to access the appropriate entry in the entertainment asset table 40. At operation 106, the communication module 38 communicates (e.g., streams, playout) the entertainment asset 44 over the network 16 to the receiving device 12.

At operation 108 the receiving device 12 receives and renders the entertainment asset 44 to the display device 26 at the normal speed for the entertainment asset 44 until a scheduled advertisement.

At operation 110, at the streaming server 28, the communication module 38 communicates primary content 32 embodied as an advertisement asset 46.

At operation 112, the receiving device 12 receives and renders the advertisement asset 46 at normal speed on the display device 26 and the sound device 24. At operation 114, the user may decide not to watch the advertisement and select the fast forward button on the remote control 20 to accelerate the forward speed of the advertisement. Responsive to the request, the receiving device 12 may communicate the fast forward trick mode request to the streaming server 28. For example, the user may request fast forwarding at twice the normal speed (e.g., 2×FF) of the advertisement asset 46 by pressing a fast forward button on the remote control 20 once.

At operation 116, at the streaming server 28, the request module 36 receives the trick mode request from the receiving device 12. For example, the trick mode request may include a primary content identifier, a direction identifier (e.g., forward or reverse) and a speed identifier (e.g., 2×, 4×, 6×, etc.).

At operation 118, the communication module 38 associates primary content 32 to secondary content 35 in the form of the advertisement asset 46 to the corresponding secondary content 35 in the form of an advertisement recording 54 responsive to the request. For example, the communication module 38 may associate the advertisement asset 46 to a version that is twice the normal speed (e.g., 2×FF) of the advertisement recording 54. In addition, the communication module 38 may initiate fast forwarding of the advertisement asset 46 at twice the normal speed without streaming the advertisement asset 46 to the receiving device 12. At operation 120, the communication module 38 may communicate (e.g., playout, stream, etc.) secondary content 35 embodied as the advertisement recording 54 to the receiving device 12.

At operation 122, the receiving device 12 may receive and render the advertisement recording 54 (e.g., derivative secondary content) at normal speed to the output device 18 until the advertisement recording 54 ends at operation 124. At operation 126 the user requests the play mode by pressing the play button on the remote control 20 and the receiving device 12 communicates the request to the streaming server 28.

At operation 128, at the streaming server 28, the request module 36 receives the request and at operation 130 the communication module 38 communicates the entertainment asset 44 to the receiving device 12.

At operation 132 the receiving device 12 receives and renders the entertainment asset 44 to the display device 26 and the sound device 24 at a normal speed for the advertisement asset 44.

OTHER EXAMPLES

Offsets into Primary and Secondary Content

The user in the above example entered a fast forward trick mode request at the beginning of a discrete unit of primary content 32 (e.g., advertisement asset 46) and the communication module 38 responded by causing the rendering of a discrete unit of secondary content 35 (e.g., advertisement recording 54) from the beginning of the discrete unit of secondary content 35 (e.g., advertisement recording 54). It will be appreciated by one skilled in the art that other examples may include the user entering a fast forward trick mode request at some offset into the primary content 32 and the communication module 38 responding by advancing to a corresponding offset from the beginning of the secondary content 35 (e.g., associated advertisement recording 54) and commencing the rendering of the secondary content 35 (e.g., advertisement recording 54) from the identified offset. For example, a user that enters a fast forward trick mode request in the middle of an advertisement asset 46 may cause the communication module 38 to begin rendering the associated advertisement recording 54 in the middle of the advertisement recording 54. In general, the author of the secondary content 35 may exercise complete editorial control over selection of the offset into the secondary content 35 from which rendering is to begin based on the offset into the primary content 32 that may detected responsive to the trick mode request. It will further be appreciated that the author of secondary metadata 58 and a secondary application 60 may exercise the same editorial control.

OTHER EXAMPLES

Fast Forwarding Past the End of Secondary Content

A user that continues to fast forward after the secondary content 35 (e.g., advertisement) has ended may, in one embodiment, view primary content 32 that may be rendered at an accelerated speed.

EXAMPLE EMBODIMENTS

Secondary Information

In response to the trick mode request, the communication module 38, in the above described example embodiment, communicated advertisement secondary information 39 in the form of the advertisement recording 54. It will be appreciated by one skilled in the art that other example embodiments may utilize different advertisement secondary information 39. For example, other types of advertisement secondary information 39 may include secondary metadata 58, secondary applications 60 or secondary content 35 in the form of an advertisement slide show 70.

EXAMPLE EMBODIMENT

Secondary Metadata

In response to the trick mode request, the communication module 38 may utilize advertisement recording metadata 72 or the advertisement slide show metadata 78, according to one embodiment. For example, the advertisement recording metadata 72 may be processed by the communication module 38 to generate an advertisement recording 54 and the advertisement recording metadata 72 may be processed by the communication module 38 to generate an advertisement slide show 70. In both examples, the communication module 38 may utilize the respective metadata 72, 74 to identify a subset of reference frames 86 and reference frame changes 84 in the associated advertisement asset 46 to respectively generate the advertisement recording 54 and the advertisement recording metadata 72.

EXAMPLE EMBODIMENT

Secondary Application

In response to the trick mode request, the communication module 38 may utilize a secondary application 60, according to one embodiment. For example, the secondary application 60 may be embodied as the advertisement application 76. The advertisement application 76 may be executed by the communication module 38 to generate secondary content 35 in the form of the advertisement recording 54 or the advertisement slide show.

OTHER EXAMPLES

Medium and Presentation of Primary and Secondary Content

Other example may include primary content 32 and secondary content 35 that may be embodied in one or more mediums (e.g., visual, audio, kinetic, etc.), the visual medium presented as motion or still. It will be appreciated by one skilled in the art that the medium and presentation of primary content 32 does not necessarily determine the medium and presentation of secondary content 35 and that any combination of the medium and presentation of the primary content 35 may be associated to secondary content in any combination of medium and presentation. For example, primary content 32 embodied solely in audio may be associated with secondary content 35 embodied as audio and visual (e.g., motion or still). In another embodiment, secondary content 35 may include non-derivative secondary content 35 and derivative secondary content 35. For example, secondary content 35 may include video that may be derived from the corresponding primary content 32 and audio that may not be derived from the corresponding primary content 32.

OTHER EXAMPLES

Entertainment Assets

It will be appreciated by one skilled in the art that primary content 32 may also be embodied in the form of entertainment assets 46. Accordingly, the entertainment asset 46 may be associated to corresponding entertainment secondary information 37 (e.g., entertainment recording 52, entertainment slide show 62, entertainment recording metadata 64, entertainment slide show metadata 66, entertainment application 68).

OTHER EXAMPLE

Primary Content Played From Local Storage Device

Further, it will be appreciated by one skilled in the art that the primary content 32 may not be immediately played on the output device 18 but rather stored to a local storage device (e.g., memory, database 22) for later or delayed playback.

OTHER EXAMPLES

Medium and Presentation of Primary and Secondary Content

Other example may include primary content 32 and secondary content 35 that may be embodied in one or more mediums (e.g., visual, audio, kinetic, etc.), the visual medium presented as motion or still. It will be appreciated by one skilled in the art that the medium and presentation of primary content 32 does not necessarily determine the medium and presentation of secondary content 35 and that any combination of the medium and presentation of the primary content 35 may be associated to secondary content in any combination of medium and presentation. For example, primary content 32 embodied solely in audio may be associated with secondary content 35 embodied as audio and visual (e.g., motion or still). In another embodiment, secondary content 35 may include non-derivative secondary content 35 and derivative secondary content 35. For example, secondary content 35 may include video that may be derived from the corresponding primary content 32 and audio that may not be derived from the corresponding primary content 32.

OTHER EXAMPLE

Non-Derivative Secondary Content

In response to the trick mode request, the communication module 38, in the above described example embodiment, communicated derivative secondary content (e.g., advertisement recording 54) for rendering to an output device 18 at a normal speed for the derivative secondary content. In another example, the communication module 38 may have communicated non-derivative secondary content (e.g., advertisement recording 54).

Figure 7:
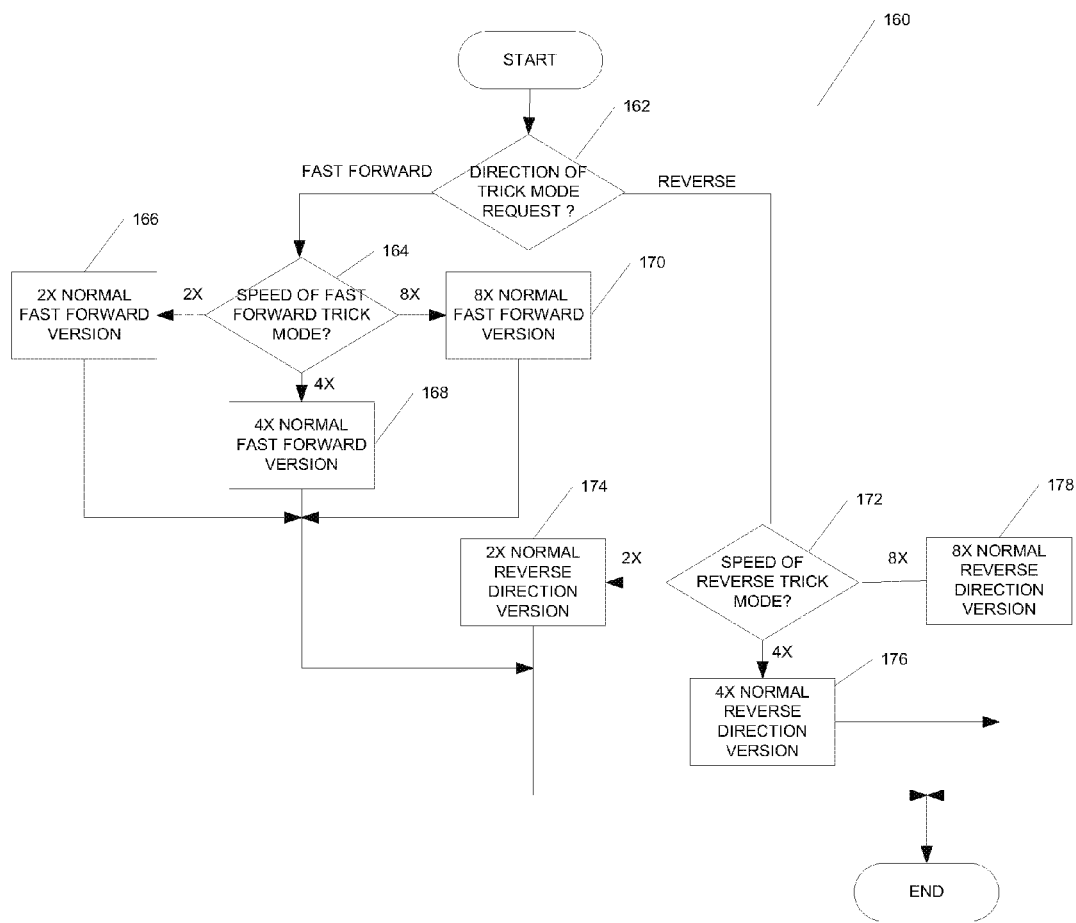
FIG. 7 is a flowchart illustrating a method, according to an example embodiment, to identify secondary information based on a trick mode request.

FIG. 7 is a flowchart illustrating a method 160, according to an example embodiment, to identify secondary information 34 based on a trick mode request. The method 160 commences at decision operation 162 with the communication module 38 determining the direction of the trick mode request. If the communication module 38 determines that the trick mode request is a fast forward request then a branch is made to decision operation 164. Otherwise, the communication module 38 determines the trick mode request is a rewind or reverse request and branches to decision operation 172.

At decision operation 164, the communication module 38 determines the speed of the trick mode request. If the communication module 38 determines the trick mode request is twice-times normal speed then a branch is made to operation 166. If the communication module 38 determines the trick mode request is four-times normal speed then a branch is made to operation 168. If the communication module 38 determines speed of the trick mode request is eight-times the normal speed then a branch is made to operation 170. At operations 166, 168 and 170 the communication module 38 identifies two-times, four-times and eight-times normal fast forward versions respectively.

At decision operation 172 the communication module 38 determines the speed of the rewind or reverse trick mode request. If the speed of the rewind trick mode request is two-times, four-times, or six-times the normal speed then a branch is made to operation 174, 176 and 178 respectively.

Figure 8:
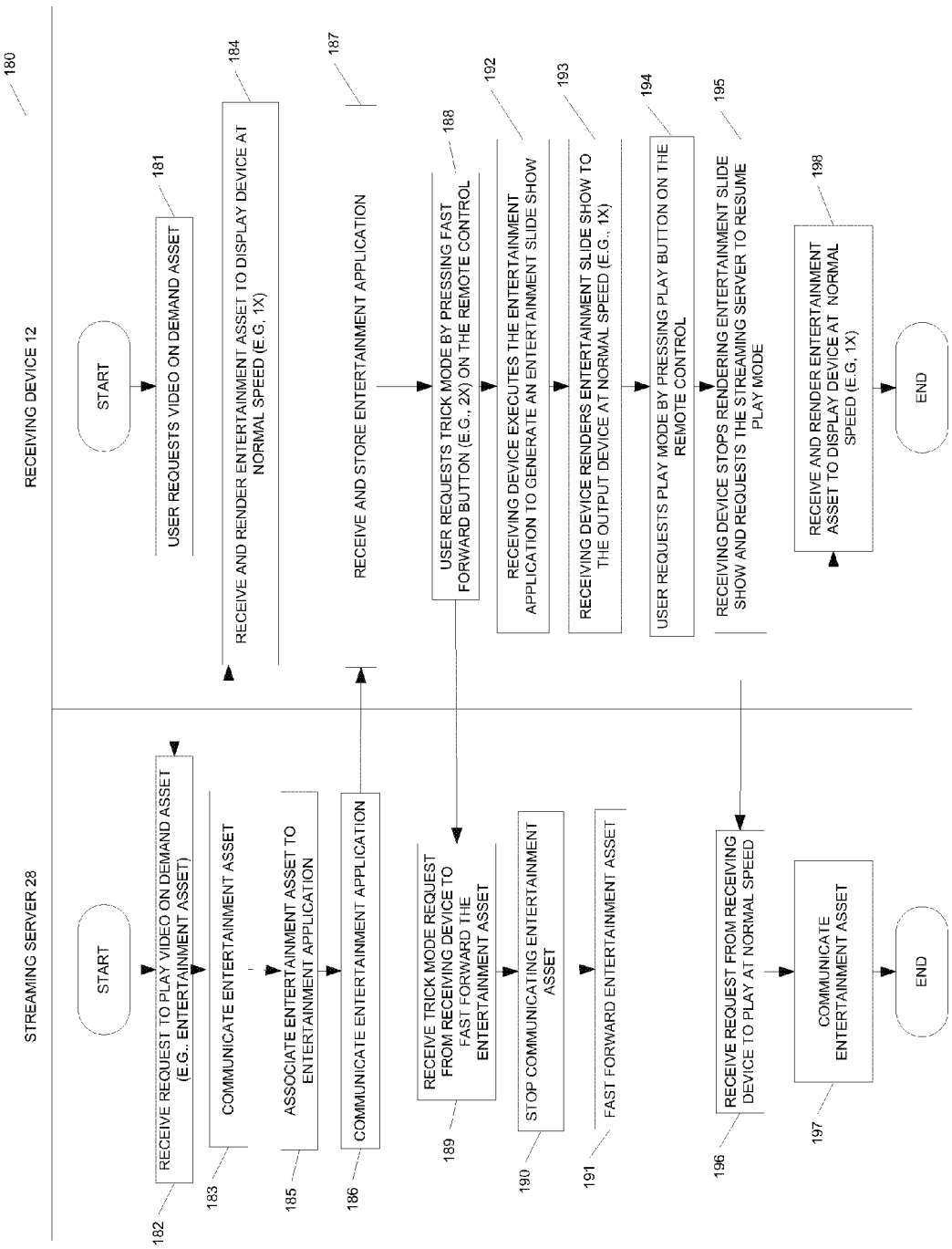
FIG. 8 is a flowchart illustrating a method, according to an example embodiment.

FIG. 8 is a flowchart illustrating a method 180, according to an example embodiment. Illustrated on the right are operations performed on the receiving device 12 and illustrated on the left are operations performed on the streaming server 28. The method 180 commences at the receiving device 12, at operation 181, with the user requesting an entertainment asset 44. For example, the user may use a remote control 20 to select a video on demand asset from a menu that is displayed on the display device 26. In response to the user's request, the receiving device 12 may communicate the request over the network 16 to the streaming server 28. In an example embodiment the receiving device 12 and the streaming server may utilize the real time streaming protocol (RTSP).

At operation 182, at the streaming server 28, the request module 36 receives the request to play the video on demand asset. For example, the request may include primary content identifier that may be used to access the appropriate entry in the entertainment asset table 40. At operation 183, the communication module 38 communicates (e.g., streams, playout) the entertainment asset 44 over the network 16 to the receiving device 12.

At operation 184, the receiving device 12 receives and renders the entertainment asset 44 to the display device 26 at the normal speed for the entertainment asset 44.

At operation 185, at the streaming server 28, the communication module 38 associates the primary content 32 to secondary information 34. For example, the communication module 38 may utilize the primary content identifier to identify corresponding secondary information 34 in the entertainment secondary information table 48 (e.g., entertainment application).

At operation 186, at the streaming server 28, the communication module 38 may communicate the entertainment application 68 to the receiving device 12. For example, the communication module 38 may communicate all versions of the entertainment application 68 (e.g., 2×FF VERSION, 4×FF VERSION, 6×FF VERSION, 2×REW VERSION, 4×REW VERSION, 6×REW VERSION) to the receiving device 12.

At operation 187, the receiving device 12 receives and stores all versions of the entertainment application 68 on the database 22.

At operation 188, the user may select the fast forward button on the remote control 20 to accelerate the forward speed of the entertainment asset. Responsive to the request, the receiving device 12 may communicate the fast forward trick mode request to the streaming server 28. For example, the user may request fast forwarding at twice the normal speed (e.g., 2×FF) of the advertisement asset 46 by pressing a fast forward button on the remote control 20 once.

At operation 189, at the streaming server 28, the request module 36 receives the trick mode request from the receiving device 12. For example, the trick mode request may include a primary content identifier, a direction identifier (e.g., forward or reverse) and a speed identifier (e.g., 2×, 4×, 6×, etc.).

At operation 190, at the streaming server 28, the communication module 38 stops streaming or communicating the entertainment asset 44 to the receiving device 12. At operation 191, the communication module 38 fast forwards the entertainment asset 44.

At operation 192, the receiving device 12 executes the appropriate version of the entertainment application 68 (e.g., 2×FF VERSION) to generate non-derivative secondary content in the form of an entertainment slide show 62. At operation 193, the receiving device 12 renders the entertainment slide show 62 to the output device 18.

At operation 194 the user requests the play mode by pressing the play button on the remote control 20. In response, at operation 195, the receiving device 12 stops rendering the entertainment slide show 62 to the output device 18 and communicates a play request to the streaming server 28.

At operation 196, at the streaming server 28, the request module 36 receives the request to play the entertainment asset 44. At operation 196, the communication module 38 stops fast forwarding the entertainment asset 44 and communicates (e.g., streams, playout) the entertainment asset 44 over the network 16 to the receiving device 12.

At operation 198, the receiving device 12 receives and renders the entertainment asset 44 to the output device 18 at a normal speed for the advertisement asset 44.

OTHER EXAMPLE EMBODIMENTS

In response to the trick mode request, the receiving device 12, in the above described example embodiment, utilized entertainment secondary information 37 in the form of an entertainment application 68 to generate an entertainment slide show 62. It will be appreciated by one skilled in the art that other example embodiments may utilize different entertainment secondary information 37. For example, other types of entertainment secondary information 37 may include secondary content 35 and a secondary application 60 that may generate an entertainment recording 52.

OTHER EXAMPLE EMBODIMENTS

Secondary Content

In response to the trick mode request, the communication module 38, in other example embodiments, may render secondary content 35. For example, the secondary content 35 may include an entertainment recording 52 or an entertainment slide show 62.

OTHER EXAMPLES

Advertisement Assets

Further, it will be appreciated by one skilled in the art that primary content 32 may also include an advertisement asset 46. Accordingly, the advertisement asset 46 may be associated to corresponding advertisement secondary information 39 (e.g., advertisement recording 54, advertisement slide show 70, advertisement application 76).

OTHER EXAMPLES

Offsets into Primary and Secondary Content

As previously described, in like manner, the author of secondary content 35 may exercise complete editorial control over selection of the offset into the secondary content 35 from which rendering is to begin based on the offset into the primary content 32 that may detected responsive to the trick mode request. It will further be appreciated that the author of secondary metadata 58 and a secondary application 60 may exercise the same editorial control.

OTHER EXAMPLE EMBODIMENTS

Primary Content Played From Local Storage Device

Further, it will be appreciated by one skilled in the art that the primary content 32 may not be immediately played on the output device 18 but rather stored to a local storage device (e.g., memory, database 22) for later or delayed playback.

OTHER EXAMPLES

Medium and Presentation of Primary and Secondary Content

Other example may include primary content 32 and secondary content 35 that may be embodied in one or more mediums (e.g., visual, audio, kinetic, etc.), the visual medium presented as motion or still. It will be appreciated by one skilled in the art that the medium and presentation of primary content 32 does not necessarily determine the medium and presentation of secondary content 35 and that any combination of the medium and presentation of the primary content 35 may be associated to secondary content in any combination of medium and presentation. For example, primary content 32 embodied solely in audio may be associated with secondary content 35 embodied as audio and visual (e.g., motion or still). In another embodiment, secondary content 35 may include non-derivative secondary content 35 and derivative secondary content 35. For example, secondary content 35 may include video that may be derived from the corresponding primary content 32 and audio that may not be derived from the corresponding primary content 32.

OTHER EXAMPLE

Derivative Secondary Content

In response to the trick mode request, in the above described example embodiment, the receiving device used the entertainment application 68 to generate non-derivative secondary content (e.g., entertainment slide show 62) for rendering to an output device 18. In another example, the receiving device 12 may have used the entertainment application 68 to generate derivative secondary content (e.g., entertainment slide show 62) for rendering to the output device 18 at a normal speed for the derivative secondary content.

OTHER EXAMPLES

Fast Forwarding Past the End of Secondary Content

A user that continues to fast forward after the secondary content 35 (e.g., advertisement) has ended may, in one embodiment, result in the receiving device 12 viewing corresponding primary content 32 that may be rendered at an accelerated speed. For example, the receiving device 12 may request the streaming server 28 to communicate primary content 32 that may be rendered at an accelerated speed.

Figure 9:
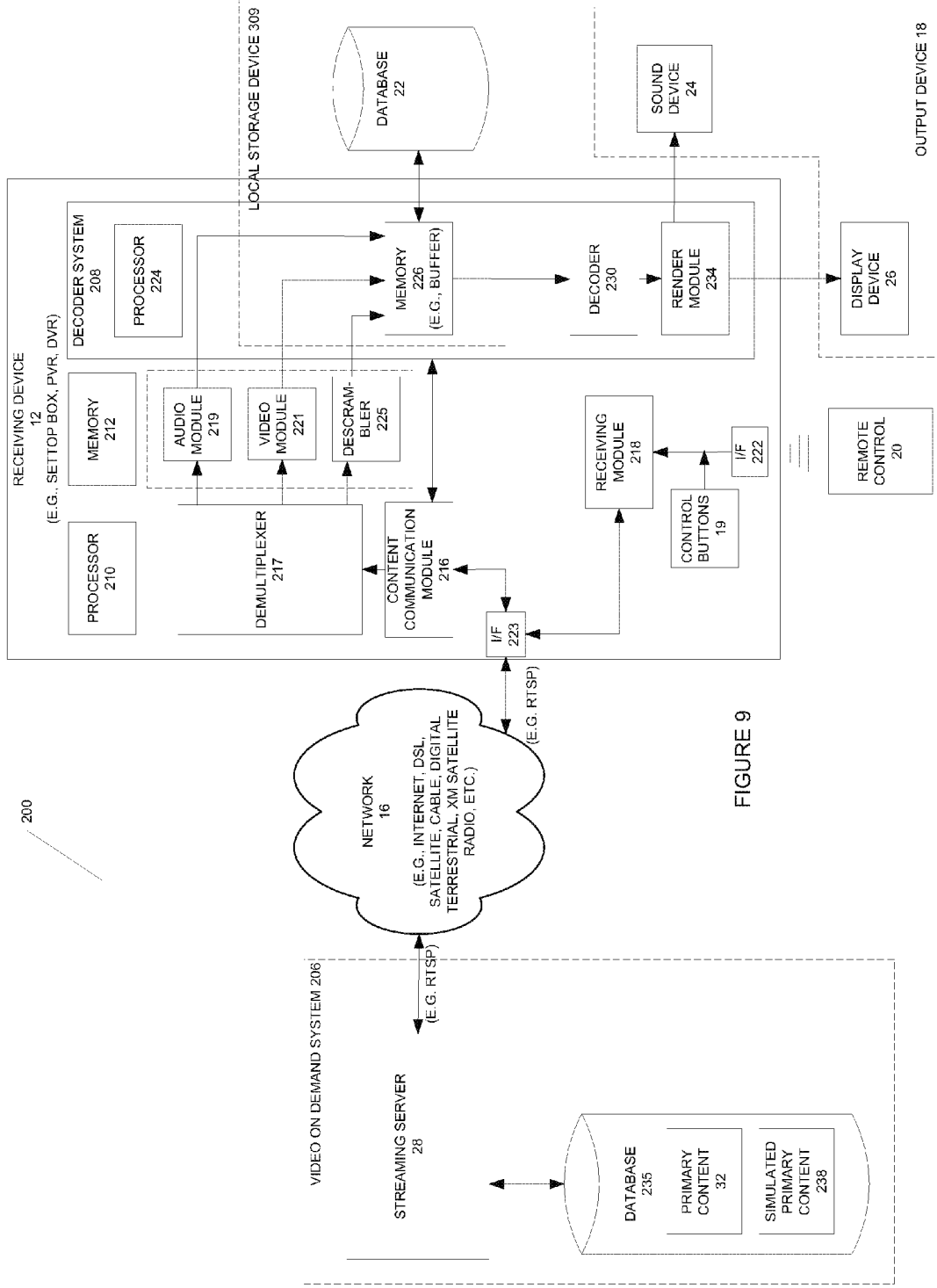
FIG. 9 is a block diagram illustrating a system, according to an example embodiment, to modify simulated primary content at a receiving device.

FIG. 9 is a block diagram illustrating a system 200, according to an example embodiment, to modify simulated primary content 238 at a receiving device 12. The system 200 is shown to include a receiving device 12, a network 16 and a video on demand system 206.

The receiving device 12 has previously been described. Further description is provided below for previously unmentioned components. The receiving device 12 may include a decoder system 208, a processor 210, a memory 212, a content communication module 216, a demultiplexer 217, an audio module 219, a video module 221, a descrambler 225, a receiving module 218, control buttons 19, an interface 222, and an interface 223, and a local storage device 309.

The processor 210 may execute instructions and move data to and from the memory 212 and the memory 226. The content communication module 216 may receive primary content 32 and/or simulated primary content 238 from the network 204 via the interface 223 and communicate the primary content 32 and simulated primary content 238 to the demultiplexer 217. Further, the content communication module 216 may utilize the simulated primary content 238 to generate the secondary content 35 in the form of a programmatically generated entertainment slide show, a programmatically generated entertainment recording, a programmatically generated advertisement slide show, or a programmatically generated advertisement recording. The receiving module 218 may receive a request from the control buttons 19 or the remote control 20. For example, the receiving module 218 may receive a request to fast forward or reverse (e.g., rewind) primary content at an accelerated speed that may be 2×, 4×, or 6× normal speed. The demultiplexer 217 may demultiplex the primary content 32 and the simulated primary content 238 into audio, video, and meta-data streams that may be respectively communicated to the audio module 219, the video module 221 and the descrambler 225. The metadata stream may include descrambling information that includes conditional access decryption keys that may be used by the descrambler 225 to descramble or decrypt the audio and video streams. Other embodiments may not include the descrambler 225. The audio module 219 may process the audio and communicate the audio to the memory 226. Similarly, the video module 221 may process the video and communicate the video to the memory 226.

The decoder system 208 is shown to include a processor 224, a memory 226, a decoder 230 and a render module 234. The processor 224 may be used for executing instructions and moving data. For example, the processor 224 may be used to move the primary content 32, the simulated primary content 238 or other data from the memory 226 to the decoder 230. The decoder 230 may decode the packets/frames into image and sound data. The render module 234 may render the sound data to the sound device 24 and render image data to the display device 26.

The local storage device 309 may include a circular buffer that includes both the memory 226 and the database 22. The circular buffer may be utilized by the receiving device 12 to store the primary content 32 and/or simulated primary content 238. For example, a user may be watching a movie and select a pause button on the remote control 20 to answer a telephone call. Responsive to selection of the pause button, the movie may be stored in the circular buffer. Subsequent to completing the telephone call the user may select the play button on the remote control 20 to prompt the receiving device 12 to resume rendering of the move to the output device 18 by retrieving the movie from the circular buffer. In addition, the local storage device 309 may include a file structure for storing and retrieving the primary content 32 and/or simulated primary content 238.

The video on demand system 206 is shown to include a streaming server 28 and a database 235. The streaming server 28 responds to requests for primary content 32 by reading primary content 32 from the database 235 and communicating the primary content 32 over the network 16 to the receiving device 12. Further, the streaming server 28 may respond to a trick mode request by associating the primary content 32 to simulated primary content 238 and communicating (e.g., stream, playout) the simulated primary content 238 over the network 14 to the receiving device 12.

Generally speaking, a user may operate the control buttons 19 or the remote control 20 to fast forward or rewind (e.g., reverse) the primary content 32 that is presently rendered on the output device 18. In response to receiving the trick mode request, the receiving device 12 may communicate the trick mode request over the network 204 to the streaming server 28. The streaming server 28 may receive the primary content 32 and associate the primary content 32 to simulated primary content 238. Next, the streaming server 28 may communicate the simulated primary content 238 to the receiving device 12. At the receiving device 12, the content communication module 216 may receive the simulated primary content 238 and utilize the simulated primer content 238 to generate derivative secondary content. For example, the generated derivative secondary content may be embodied as a programmatically generated entertainment slide show. Finally, the programmatically generated entertainment slide show may be rendered to the output device 18 at a normal speed.

While the system 10 shown in FIG. 9 employs a client-server architecture, the present disclosure is of course not limited to such an architecture, and could equally well find application in a distributed, or peer-to-peer, architecture system. The content communication module 216 and the receiving module 218 may also be implemented as standalone software programs, which do not necessarily have networking capabilities.

Figure 10:
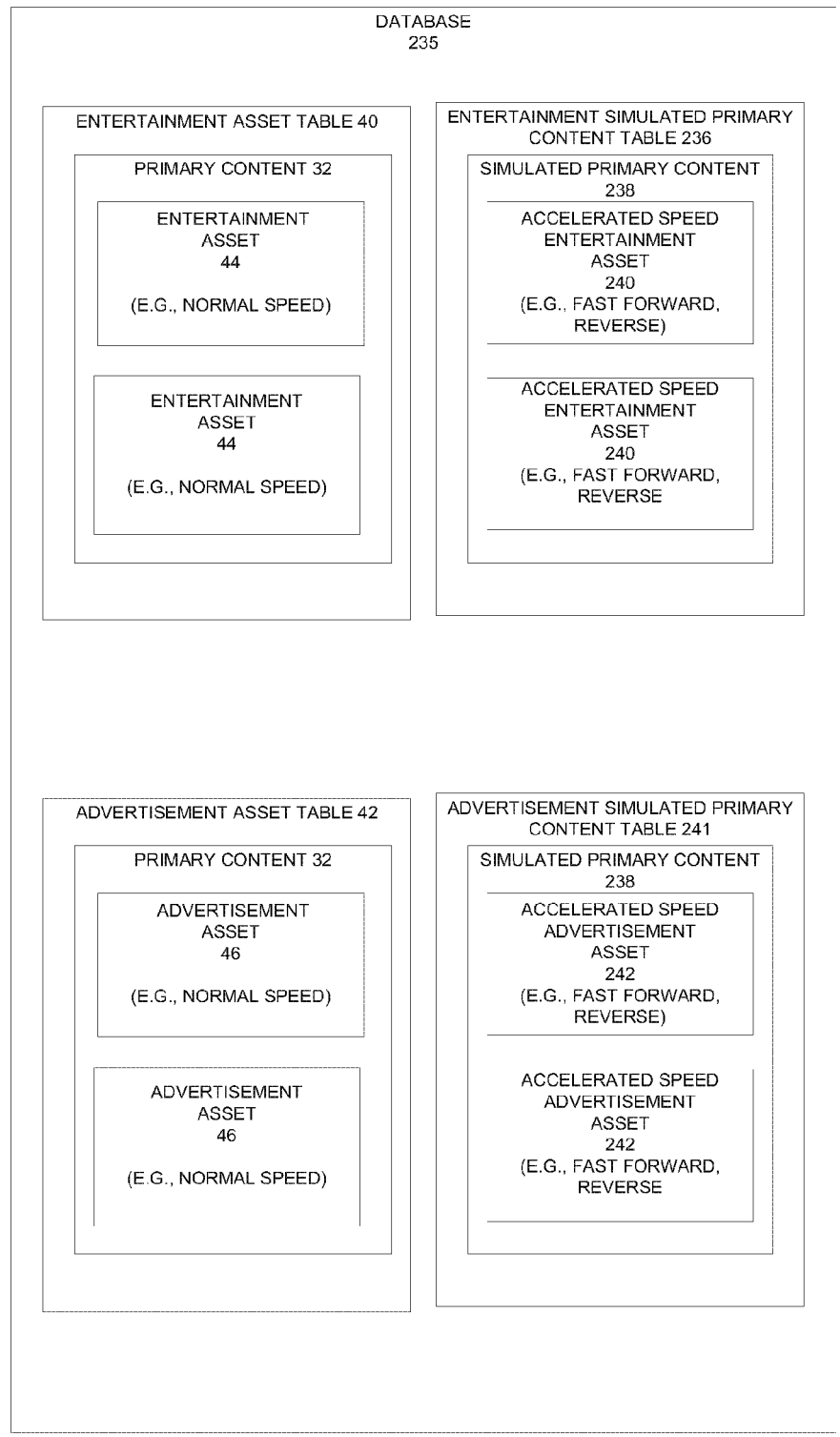
FIG. 10 is a block diagram illustrating a database, according to an example embodiment.

FIG. 10 is a block diagram illustrating a database 235, according to an example embodiment. The database 235 includes an entertainment asset table 40 as previously described, an advertisement asset table 42 as previously described, an entertainment simulated primary content table 236, and an advertisement simulated primary content table 241.

The entertainment simulated primary content table 236 contains simulated primary content 238 in the form of accelerated speed entertainment assets 240. Each accelerated speed entertainment assets 240 may be associated with a corresponding entertainment asset 44. For example, the streaming server 28 may associate the entertainment asset 44 to the appropriate accelerated speed entertainment asset 240 responsive to receiving a trick mode request. The accelerated speed entertainment asset 240 may be a prerecorded version of the entertainment asset 44 played at an accelerated speed. In an example embodiment, the accelerated speed entertainment asset 240 may be prerecorded at different speeds and directions (e.g., 2× or 4× or 6×—Fast forward or 2× or 4× or 6×—Rewind).

The advertisement simulated primary content table 241 contains simulated primary content 238 in the form of accelerated speed advertisement assets 242. Each accelerated speed advertisement asset 242 may be associated with an advertisement asset 46. For example, the streaming server 28 may associate the advertisement asset 46 to the corresponding accelerated speed advertisement asset 242 responsive to receiving a trick mode request. The accelerated speed advertisement asset 242 may be a prerecorded version of the advertisement asset 46 played at an accelerated speed. In an example embodiment, the accelerated speed advertisement asset 242 may be prerecorded at different speeds and directions (e.g., 2× or 4× or 6×—Fast forward or 2× or 4× or 6×—Rewind).

Figure 11:
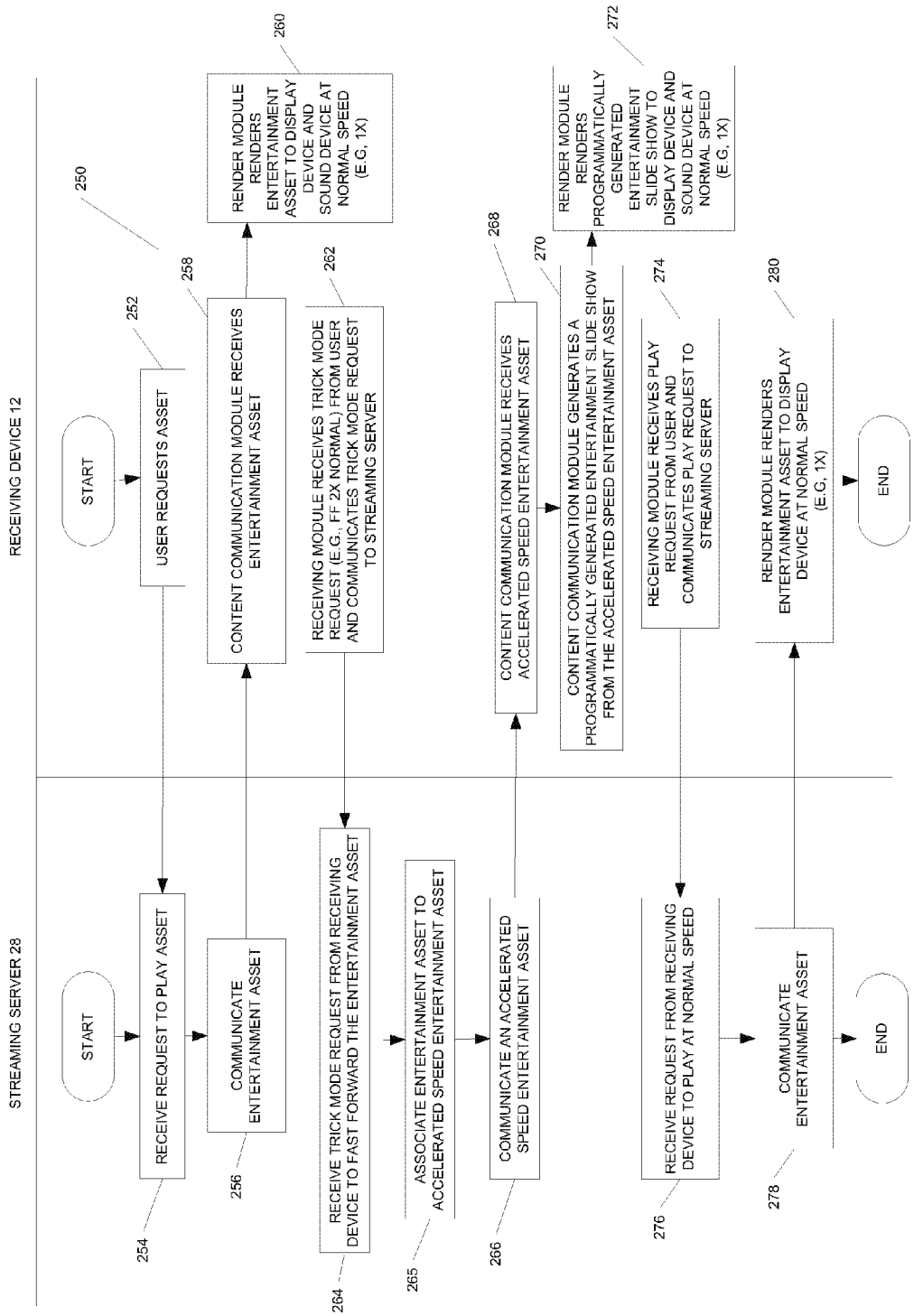
FIG. 11 is a flow chart illustrating a method, according to an example embodiment, to modify simulated primary content at a receiving device.

FIG. 11 is a flow chart illustrating a method 250, according to an example embodiment, to modify simulated primary content 238 at a receiving device 12. Operations performed by the receiving device 12 are illustrated on the right and operations performed by the streaming server 28 are illustrated on the left. The method 250 commences at the receiving device 12, at operation 252 where the user requests an entertainment asset 44 that may be communicated to the streaming server 28.

At operation 254, the streaming server 28 receives the request to play the entertainment asset 44 and retrieves the requested entertainment asset 44 from the database 235. For example, the request to play the entertainment asset 44 asset may include an entertainment asset identifier that may be used to access the requested entertainment asset 44 in the entertainment asset table 40. At operation 256, the streaming server 28 communicates the entertainment asset 44 to the receiving device 12.

At operation 258, at the receiving device 12, the content communication module 216 receives the entertainment asset 44 and communicates the entertainment asset 44 to the demultiplexer 217 that demultiplexes the entertainment asset 44 into audio, video, and metadata streams that are respectively communicated to the audio module 219, the video module 221 and descrambler 225. The audio module 219, the video module 221, and the descrambler 225 process the respective streams and communicate the results to the memory 226. For example, the descrambler 225 may utilize conditional access decryption keys in the metadata to interact with the audio module 219 and the video module 221 to decrypt or descramble the video and/or the audio.

At operation 260, the decoder 23, in the decoder system 208, decodes the entertainment asset 44 and communicates the entertainment asset 44 to the render module 234. At operation 260, the render module 234 renders the entertainment asset 44 to the output device 18 including the display device 26 and the sound device 24 at normal speed.

At operation 262, at the receiving device 12, the user enters a trick mode request (e.g., Fast Forward 2× normal speed) via the remote control 20 that is received by the receiving module 218 at the receiving device 12. The receiving module 218 may communicate the trick mode request over the network 204 to the streaming server 28. In an example embodiment the trick mode request may be communicated utilizing the real time streaming protocol.

At operation 264, the streaming server 28 receives the trick mode request from the receiving device 12. At operation 265, the streaming server 28 associates the entertainment asset 44 that is currently being communicated (e.g, streamed) to the receiving device 12 to the corresponding accelerated speed entertainment asset 240 and at operation 266 the streaming server 28 communicates the accelerated speed entertainment asset 240 to the receiving device 12.

At operation 268, at the receiving device 12, the content communication module 216 receives the accelerated speed entertainment asset 240 and communicates the accelerated speed entertainment asset 240 to the demultiplexer 217 that demultiplexes the entertainment asset 44 into audio, video, and metadata streams that are respectively communicated to the audio module 219, the video module 221 and descrambler 225. The audio module 219, the video module 221, and the descrambler 225 process the respective streams and communicate the results to the memory 226. For example, the descrambler 225 may utilize conditional access decryption keys in the metadata to interact with the audio module 219 and the video module 221 to decrypt or descramble the video and/or the audio.

At operation 270, the content communication module 216 generates secondary derivative content (e.g., programmatically generated entertainment slide show) from the accelerated speed entertainment asset 240. For example, the programmatically generated entertainment slide show may include reference frames 86 selected by the content communication module 216 from the accelerated speed entertainment asset 240 stored in the memory 226. In an example embodiment, the content communication module 216 may select reference frames by identifying different scenes in the accelerated speed entertainment asset 240. Further the content communication module 216 may add fade-ins and fade-outs. Next, the content communication module 216 communicates the programmatically generated entertainment slide show to the decoder 230 that decodes the programmatically generated entertainment slide show and communicates the programmatically generated entertainment slide show to the render module 234.

At operation 272, the render module 234 renders a programmatically generated entertainment slide show to the output device 18 at normal speed.

At operation 274, the receiving module 218 receives a play request that may be entered by the user via the remote control 20 or control buttons 19 and communicates the play request to the streaming server 28.

At operation 276, the streaming server 28 receives the request from the receiving device 12. At operation 278, the streaming server 28 may identify a location in the entertainment asset 44 based on the elapsed time from receipt of the fast forward request to receipt of the play request and may resume communicating (e.g., streaming) the entertainment asset 44 to the receiving device 12.

At operation 280, at the receiving device 12, the render module 234 renders the entertainment asset 44 to the output device 18 at normal speed.

OTHER EXAMPLE EMBODIMENTS

The content communication module 216 in the above example embodiment generated a programmatically generated entertainment slide show, however, it will be appreciated that other example embodiments may generate a programmatically generated entertainment recording, programmatically generated advertisement slide show, and a programmatically generated advertisement recording.

OTHER EXAMPLES

Offsets into Primary and Secondary Content

As previously described, in like manner, the author of the content communication module 216 may exercise complete editorial control, via the communication module 216, over the selection of the offset into the simulated primary content 238 from which rendering is to begin based on the offset into the primary content 32 that may detected responsive to the trick mode request.

Figure 12:
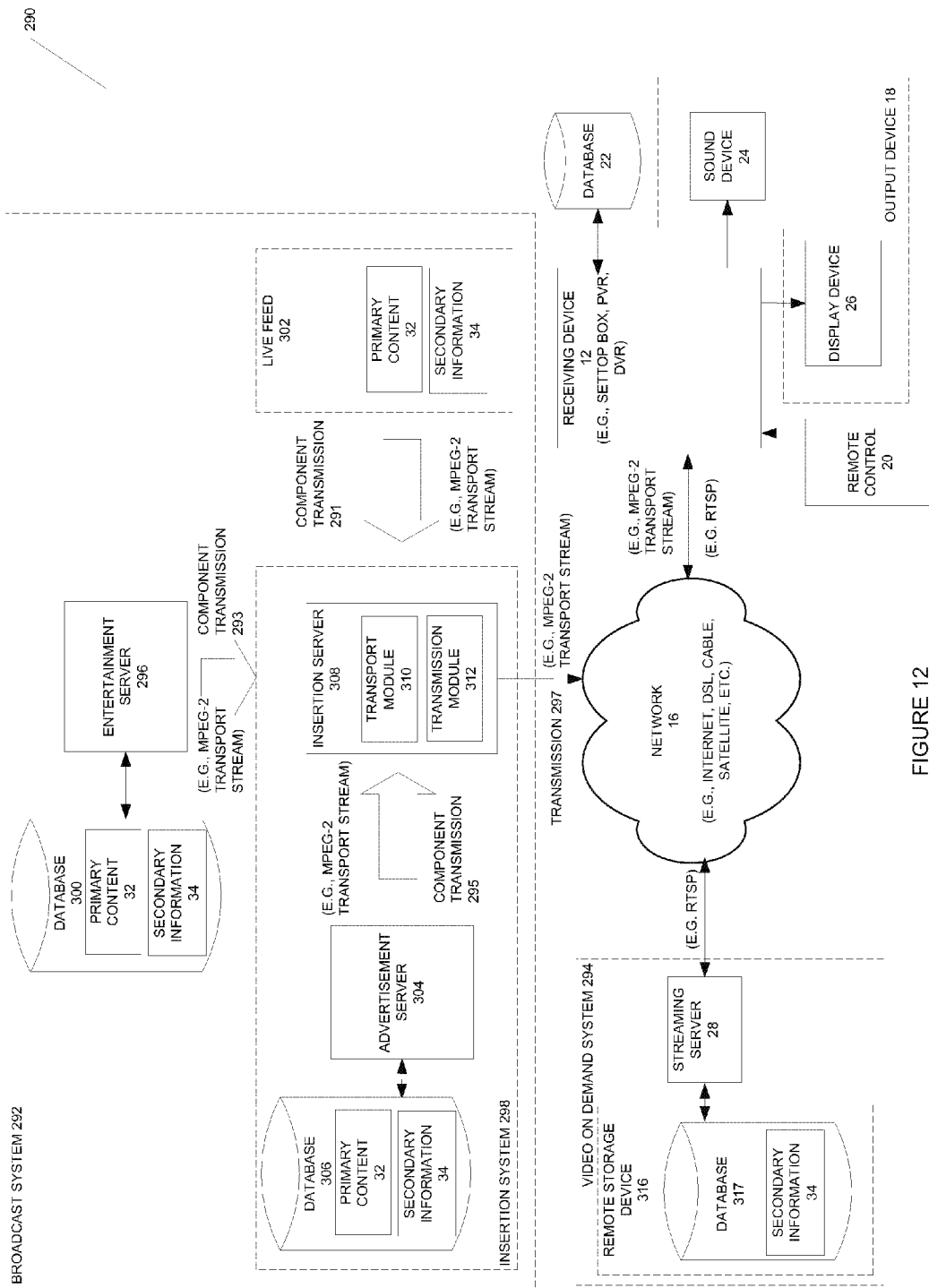
FIG. 12 is a block diagram illustrating a system, according to an example embodiment.

FIG. 12 is a block diagram illustrating a system 290, according to an example embodiment. The system 290 may be utilized to communicate a transmission that facilitates modification of playback of primary content 32 at a receiving device 12.

The system 290 includes a receiving device 12, a broadcast system 292 and a video on demand system 294. The broadcast system 292 includes an entertainment server 296 and an insertion system 298 that includes an advertisement server 304, a live feed 302 and an insertion server 308.

Broadly speaking, the insertion server 308 may receive and a component transmission 291 (e.g., Internet Protocol (IP) that includes a stream that is formatted in MPEG-2 compression format from a live feed 302, a component transmission 293 that includes a stream that is formatted in an MPEG-2 compression format from the entertainment server 296, and a component transmission 295 that includes a stream that is formatted in an MPEG-2 compression format from the advertisement server 304. The component transmission 291 that is received from the live feed 302 may include primary content 32 and secondary information 34 that is live (e.g., sporting events, election results, etc.). Accordingly, the primary content 32 received from the live feed 302 may include an entertainment asset 44 (e.g. live content) and an advertisement asset 46 (e.g. live content). Likewise, the secondary information 34 received from the live feed 302 may include an entertainment recording 52 (e.g. live content), an entertainment slide show 62 (e.g. live content), an advertisement recording 54 (e.g. live content), and an advertisement slide show (e.g. live content).

Each of the component transmissions 291, 293, 295 may include multiple channels. Each channel may include multiple packetized elementary streams that carry audio and/or visual, and/or metadata. Other example embodiments may include component transmissions 291, 293, 295 embodied in other transport formats (e.g., IP) and compression formats (e.g., MPEG-4, VC1, etc.). The transmission from the advertisement server 304 may carry primary content 32 in the form of advertisement assets 46 and secondary information 34 relating to advertisements. The transmission from the entertainment server 296 may carry primary content 32 in the form of entertainment assets 44 and secondary information 34 relating to entertainment. Next, the insertion server 308 may utilize the component transmissions 291, 293, 295 to generate a transmission 297 that is communicated over the network 16 to the receiving device 12. Other example embodiments may include the transmission 297 embodied in other compression formats (e.g., MPEG-4, VC1) or other transport formats (e.g., Internet Protocol (IP)). The secondary information 34 may include a secondary information identifier that may be used by the receiving device 12 to associate the primary content 32 to secondary content 35 that may be played out at the output device 18 at the receiving device 12 responsive to receiving a trick mode request.

The entertainment server 296 is coupled to a database 300 that may include primary content 32 and secondary entertainment information 37 as previously described.

The advertisement server 304 is shown to be coupled to a database 306 that may include primary content 32 and advertisement secondary information 39 as previously described. The insertion server 308 is shown to include a transport module 310 and a transmission module 312. The transport module 310 may receive the component transmission 291 from the live feed 302 and the component transmission 293 from the entertainment server 296 and the component transmission 295 from the advertisement server 304. Further, the transport module 310 may generate the transmission 297 based on the component transmission 291 from the live feed 302 and the component transmission 293 received from the entertainment server 296 and the component transmission 295 received from the advertisement server 304. The transmission module 312 may communicate the transmission 297 to the receiving device 12.

The video on demand system 294 includes the streaming server 28 that is shown to be coupled to a remote storage device 316 that may include a database 317 that may include secondary information 34. The receiving device 12 may utilize the secondary information 34 received in the transmission 297 to request additional secondary information 34 that is stored on the remote storage device 316.

While the system 290 shown in FIG. 12 employs a client-server architecture between the receiving device 12 and the video on demand server 28, the present disclosure is of course not limited to such an architecture, and could equally well find application in a distributed, or peer-to-peer, architecture system.

Figure 13:
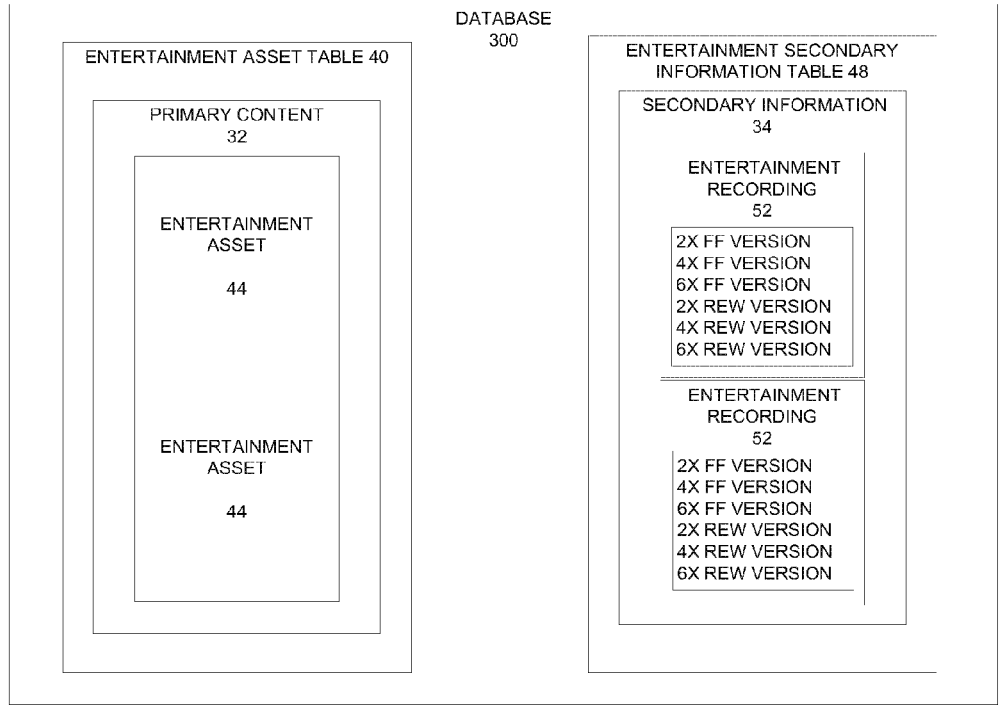
FIG. 13 is a block diagram illustrating a database, according to an example embodiment.

FIG. 13 is a block diagram illustrating a database 300, according to an example embodiment. The database 300 is coupled to the entertainment server 296 and is shown to include the entertainment asset table 40 and the entertainment secondary information table 48 as previously described. The entertainment secondary information table 48 is shown to include multiple entries of entertainment recordings 52; however, it will be appreciated by a person having ordinary skill in the art that other example embodiments of the entertainment secondary information table 48 may include other forms of secondary information 34 including the entertainment slide show 62, the entertainment recording metadata 64, the entertainment slide show metadata 66, and the entertainment application 68 all as previously described.

Figure 14:
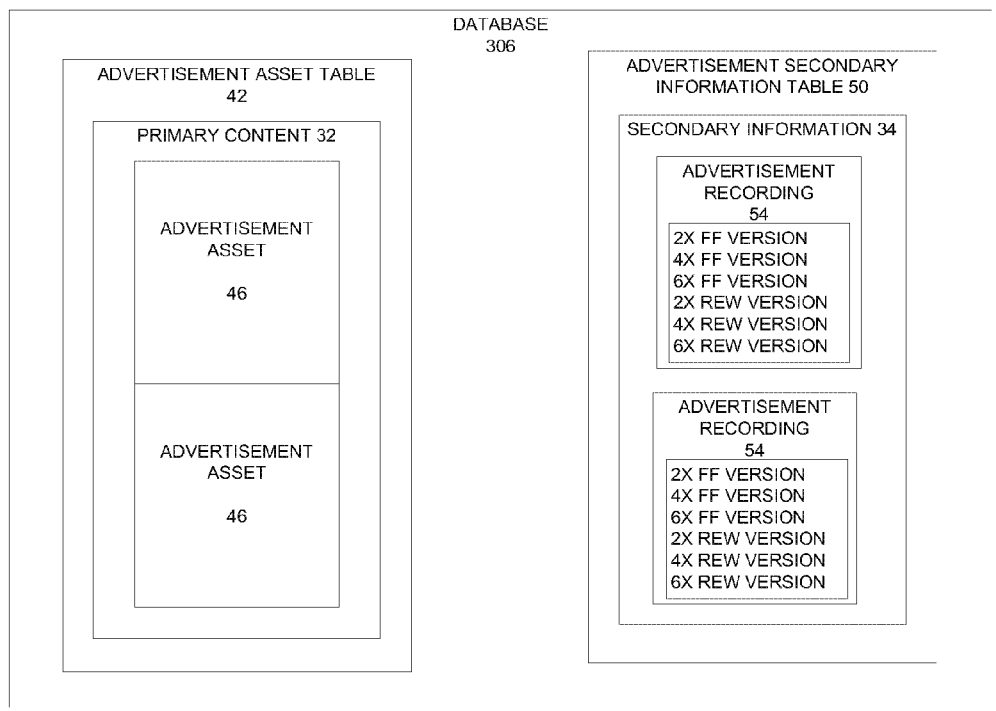
FIG. 14 is a block diagram illustrating a database, according to an example embodiment.

FIG. 14 is a block diagram illustrating a database 306, according to an example embodiment. The database 306 is coupled to the advertisement server 304 and is shown to include the advertisement asset table 42 and the advertisement secondary information table 50 as previously described. The advertisement secondary information table 50 is shown to include multiple entries of advertisement recordings 54; however, it will be appreciated by a person having ordinary skill in the art that other example embodiments of the advertisement secondary information table 50 may include other forms of secondary information 34 including the advertisement slide show 70, the advertisement recording metadata 72, the advertisement slide show metadata 74, and the advertisement application 76 all as previously described.

Figure 15:
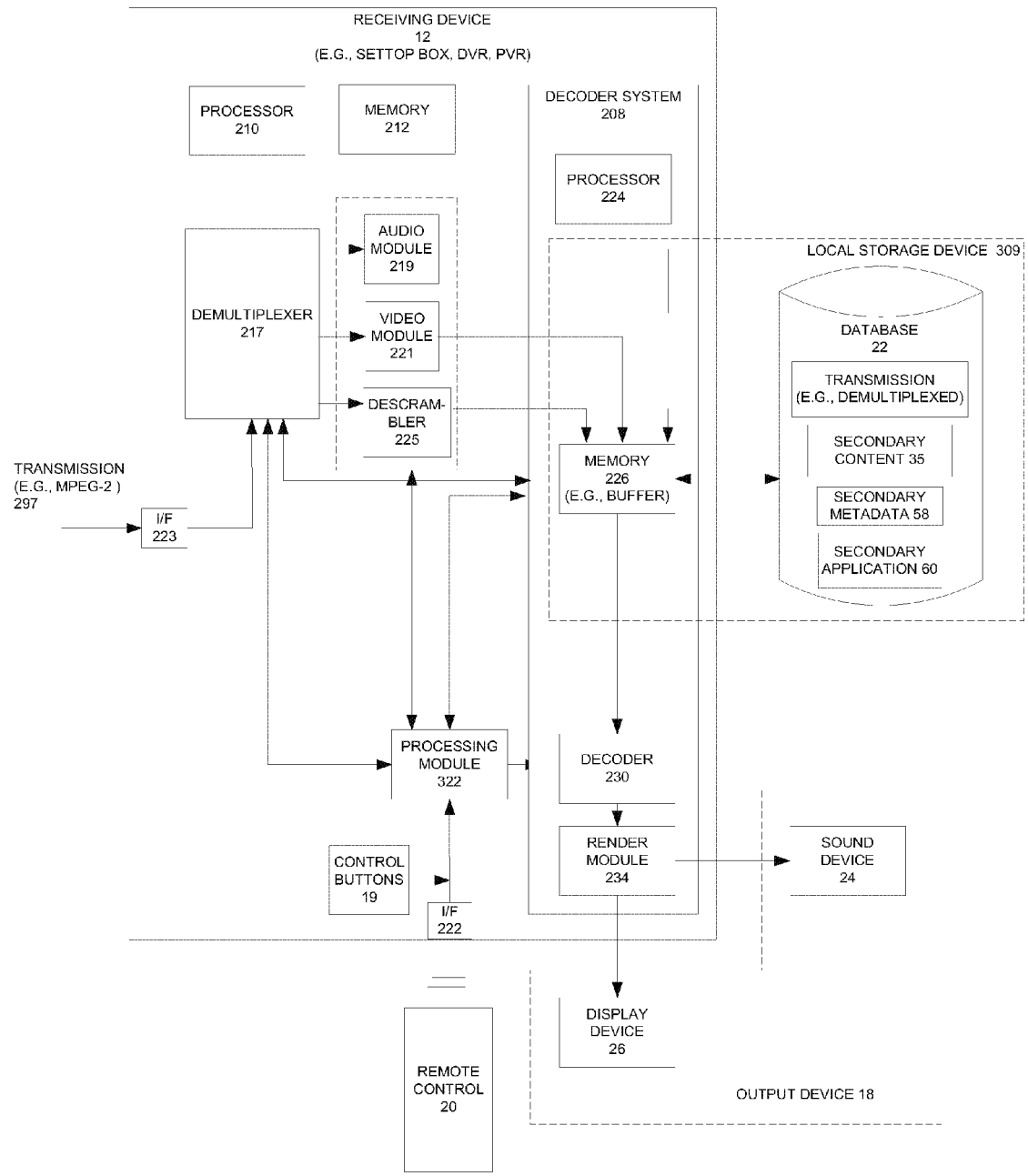
FIG. 15 is a block diagram illustrating a receiving device, according to an example embodiment.

FIG. 15 is a block diagram illustrating the receiving device 12, according to an example embodiment. The receiving device 12 has previously been described. Further description is provided below for previously unmentioned components or functions.

The receiving device 12 includes a demultiplexer 217, a local storage device 309, and a processing module 322. The demultiplexer may receive a transmission 297 from the insertion system 298, demultiplexes the transmission 297 according to channels and stores the demultiplexed transmission 297 in the local storage device 309. For example, in one embodiment, the demultiplexer 217 may utilize the audio module 219, the video module 221, and the descrambler 225 to process and store the transmission 297 in the local storage device 309. In addition, the demultiplexer 217 may identify secondary information 34 in the form of secondary content 35, secondary metadata 58, and a secondary application 60 in the demultiplexed transmission 297 and store the secondary content 35, secondary metadata 58, and a secondary application 60 as addressable files on the local storage device 309.

The local storage device 309 may include a circular buffer that includes both the memory 226 and the database 22. The circular buffer may be utilized by the receiving device 12 to store the transmission 297. For example, a user may be watching a baseball game that is broadcast live and select a pause button on the remote control 20 to answer a telephone call. Responsive to selection of the pause button, the transmission 297 may be stored in the circular buffer. Subsequent to completing the telephone call the user may select the play button on the remote control 20 to prompt the receiving device 12 to resume rendering of the baseball game to the output device 18 by retrieving the transmission 297 from the circular buffer and processing the transmission 297. In addition, the local storage device 309 may include a file structure for storing and retrieving the secondary information 34 including secondary content 56, the secondary metadata 58 and secondary applications 60. Accordingly, in an example embodiment, the local storage device 309 may be utilized to store secondary information 34 in the form of an addressable file (e.g., accessed with a URL) or in the form of a transmission 297.

The processing module 322 may receive and process requests. For example, the processing module 322 may process a request to render primary content 32 to the output device 18 at an accelerated speed of the primary content. The processing module 322 may receive the request from the remote control 20 or the control buttons 19. Responsive to receiving the request, the processing module 322 may associate the primary content 32 to secondary content 35 based on secondary information 34 in the form of a secondary information identifier that is included in the transmission 297 received by the multiplexer 214.

Figure 16A:
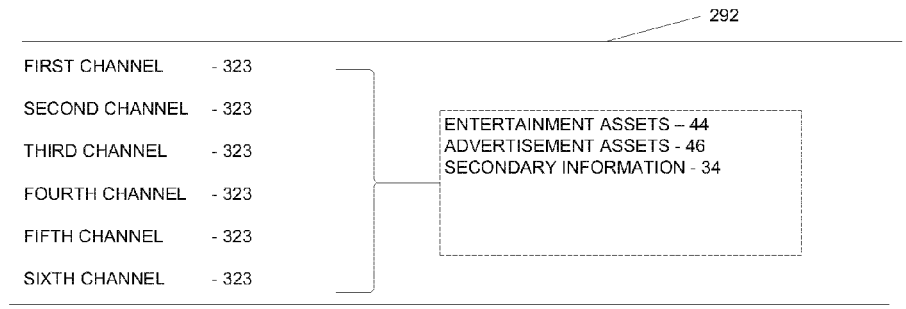
FIG. 16A is a block diagram illustrating a component transmission, according to an example embodiment.

FIG. 16A is a block diagram illustrating a component transmission 292, according to an example embodiment. The component transmission 292 may be communicated by the live feed 302 and received by the insertion server 308. The component transmission 292 may include multiple channels 323 that may carry entertainment assets 44, advertisement assets 46 and associated secondary information 34 as described further below.

Figure 16B:
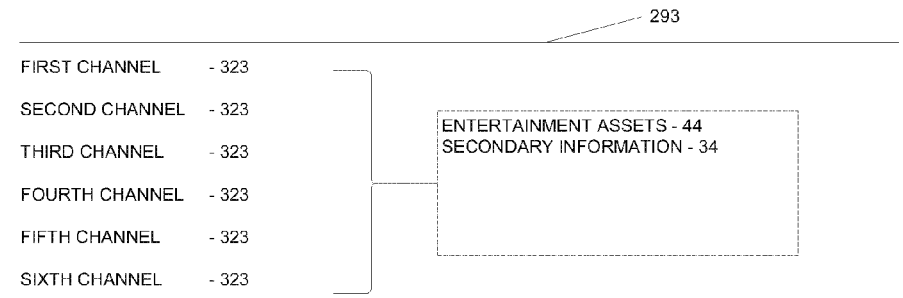
FIG. 16B is a block diagram illustrating a component transmission, according to an example embodiment.

FIG. 16B is a block diagram illustrating a component transmission 293, according to an example embodiment. The component transmission 293 may be communicated by the entertainment server 298 and received by the insertion server 308. The component transmission 293 may include multiple channels 323 that may carry entertainment assets 44 and associated secondary information 34 as described further below.

Figure 16C:
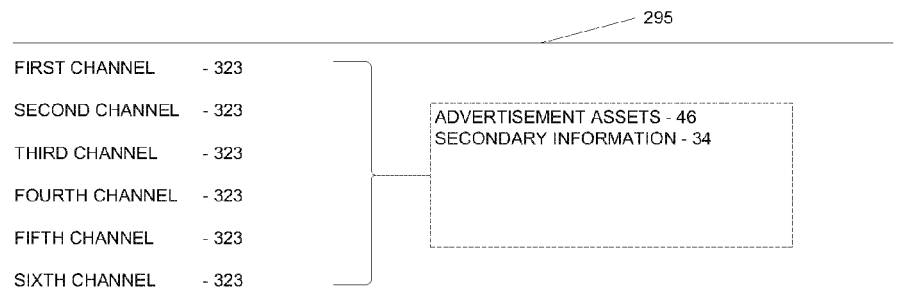
FIG. 16C is a block diagram illustrating a component transmission, according to an example embodiment.

FIG. 16C is a block diagram illustrating a component transmission 295, according to an example embodiment. The component transmission 295 may be communicated by the advertisement server 304 and received by the insertion server 308. The component transmission 295 may include multiple channels 323 that may carry advertisement assets 46 and associated secondary information 34 as described further below.

Figure 16D:
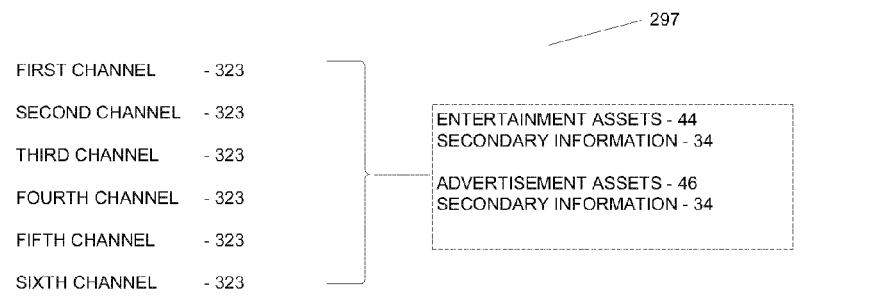
FIG. 16D is a block diagram illustrating a transmission, according to an example embodiment.

FIG. 16D is a block diagram illustrating a transmission 297, according to an example embodiment. The transmission 297 may be communicated by the insertion server 308 and received by the receiving device 12. The transmission 297 may be generated based the component transmission 291, as shown in FIG. 16A, received from the live feed 302 and the component transmission 293, as shown in FIG. 16B, received from the entertainment server 296 and the component transmission 295, as shown in FIG. 16C, received from the advertisement server 304. The transmission 297 may include multiple channels 323 that may be selected by the user via the remote control 20 or the control buttons 19. The transmission 297 may carry entertainment assets 44 and corresponding secondary information 34, advertisement assets 46 and corresponding secondary information.

Figure 17:
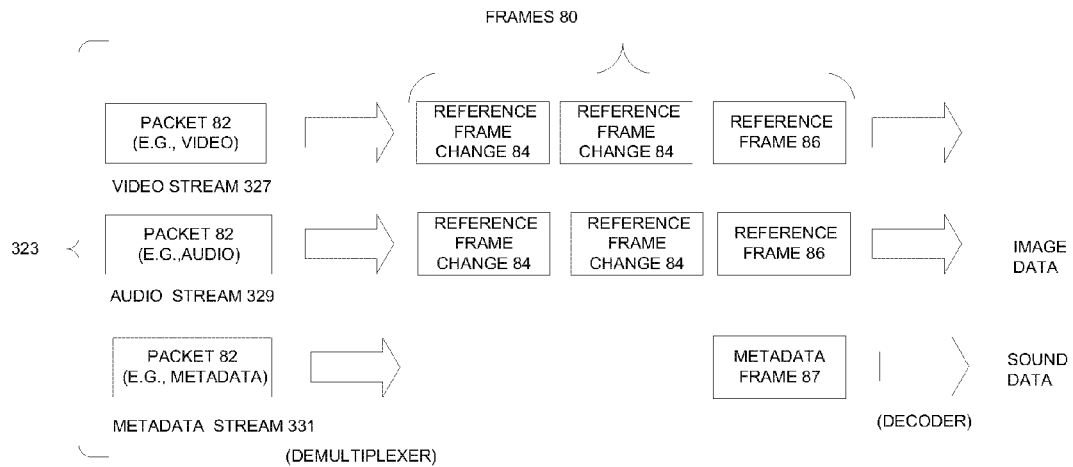
FIG. 17 is a block diagram illustrating streams associated with a channel, according to an example embodiment.

FIG. 17 is a block diagram illustrating multiple streams associated with a single channel 323, according to an example embodiment. The streams may include a video stream 327, an audio stream 329, and a metadata stream 331. Each stream 327 may be embodied as packets 82 that may be received at the demultiplexer 217 as they enter the receiving device 12. The demultiplexer 217 may concatenate the payload of the packets to generate frames 80. The frames 80 are shown to include reference frames 86 and reference frame changes 84 as previously described. The reference frames 86, the reference frame changes 84, and the metadata frames 87 may be descrambled and communicated to the decoder 230. The decoder 230 may decode the frames 80 into image data and sound data and communicate the image data and sound data to the render module 234 that renders the image and sound data to the output device 18 including the display device 26 and the sound device 24.

Figure 18:
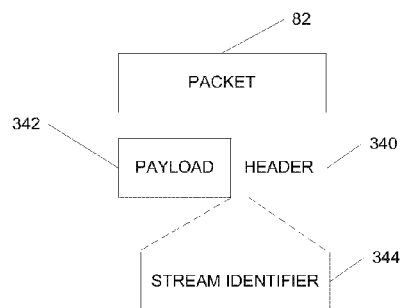
FIG. 18 is a block diagram illustrating the packet, according to an example embodiment.

FIG. 18 is a block diagram illustrating the packet 82, according to an example embodiment. The packet 82 is shown to include a header 340 and a payload 342. The header 340 may include a stream identifier 344 that may be used to identify packets 82 of a single stream. For example, a first stream identifier may identify a first stream carrying packets 82 with a video payload, a second stream identifier may identify a second stream that may include packets 82 carrying an audio payload, and a third stream identifier may identify a third stream 327 that includes packets 82 carrying a metadata payload. The payload 342 may include frame information to construct the frames 80.

Figure 19:
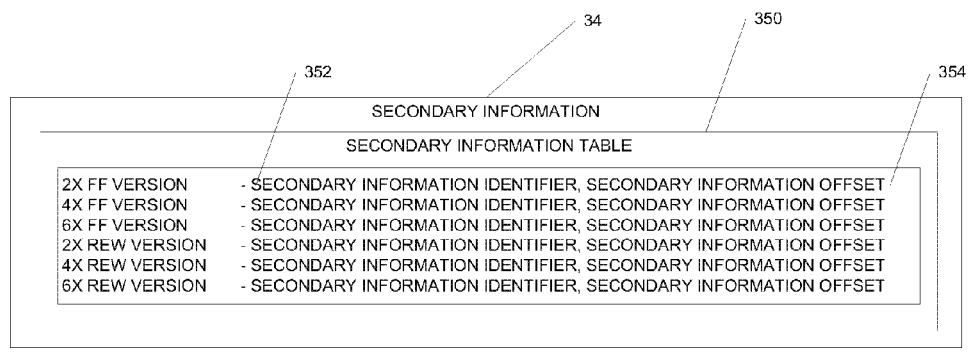
FIG. 19 is a block diagram illustrating a secondary information table, according to an example embodiment.

FIG. 19 is a block diagram illustrating secondary information 34 in the form of a secondary information table 350, according to an example embodiment. The secondary information table 350 may be carried in the metadata stream 331 of a channel 323 and may be read by the processing module 322 responsive to the receiving device 12 receiving a trick mode request. The secondary information table 350 may be utilized by the processing module 322 to identify the location of additional secondary information 34. The secondary information table 350 may include entries that correspond to the type of trick mode request. For example, trick mode requests may include fast forward and rewind versions at accelerated speeds as previously described. Each trick mode request is associated with a secondary information identifier 352 and a secondary information offset 354. The secondary information identifier 352 may identify the location of the secondary information 34. For example, the secondary information identifier may identify the audio stream 329 and video stream 327 of a channel that may be currently rendered to the output device 18, the metadata stream 331 of a channel that may be currently rendered to the output device 18, a channel 323 that is different from the channel 323 that is currently being rendered to the output device 18, a file on the local storage device 309 or a file on the remote storage device 316. The secondary information offset 354 may be utilized to identify an offset from the beginning of the identified secondary information 34. For example, the secondary information offset 354 may be expressed in bytes or time from the start of the identified secondary information 34.

Figure 20:
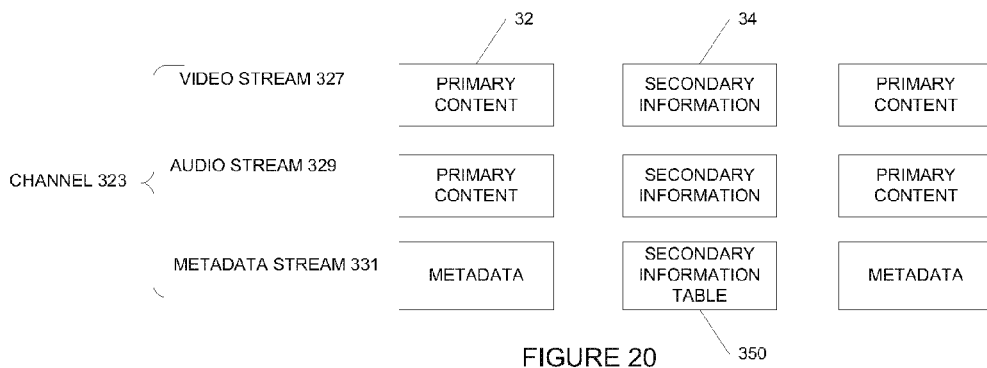
FIG. 20 is a block diagram illustrating primary content and secondary information communicated in the video stream and the audio stream of a single channel, according to an example embodiment.

FIG. 20 is a block diagram illustrating primary content 32 and secondary information 34 communicated in the video stream 327 and the audio stream 329 of a single channel 323, according to an example embodiment. The channel 323 is shown to include the video stream 327 communicating primary content 32 and secondary information 34, the audio stream 329 communicating primary content 32 and secondary information 34, and the metadata stream 331 communicating metadata and a secondary information table 350. Responsive to the primary content 32 being rendered to the output device 18 and receipt of a trick mode request, the secondary information table 350 may be accessed by the processing module 322 to identify the location of the secondary information 34 in the video stream 327 and audio stream of the same channel 323.

Figure 21:
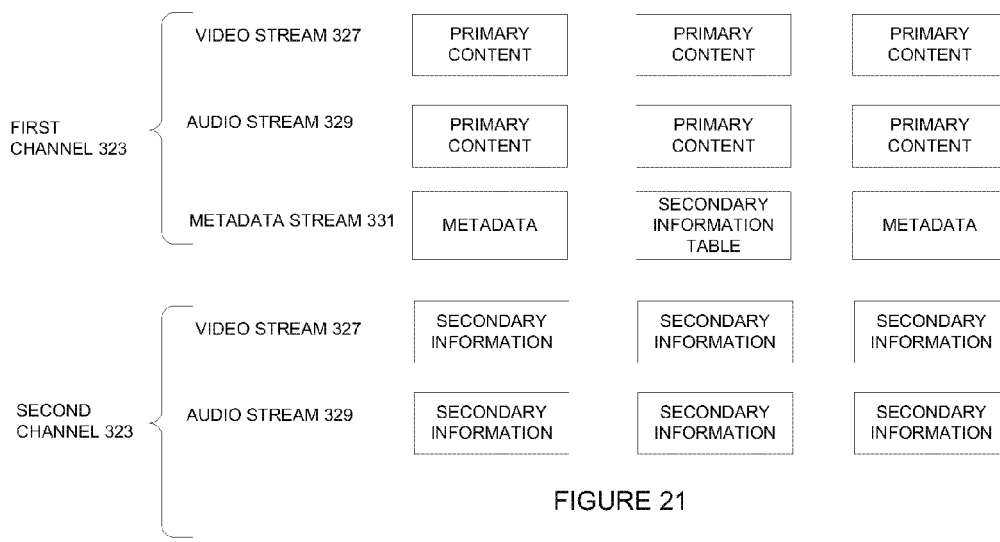
FIG. 21 is a block diagram illustrating primary content communicated in a first channel and secondary information communicated in a second channel, according to an example embodiment.

FIG. 21 is a block diagram illustrating primary content 32 communicated in a first channel 323 and secondary information 34 communicated in a second channel 323, according to an example embodiment. The first channel 323 is shown to include the video stream 327 communicating primary content 32, the audio stream 329 stream 327 communicating primary content 32, and the metadata stream 331 communicating metadata and a secondary information table 350. Responsive to the primary content 32 being rendered to the output device 18 and receipt of a trick mode request, the secondary information table 350 may be accessed by the processing module 322 to identify the location of the secondary information 34 in the video stream 327 and audio stream of the second channel 323.

Figure 22:
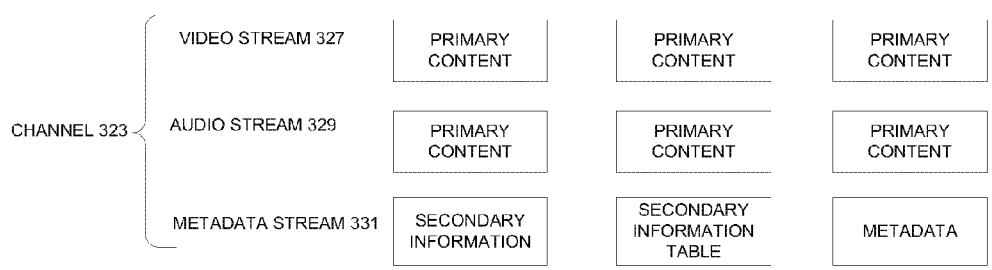
FIG. 22 is a block diagram illustrating the primary content communicated in a video stream and an audio stream of a channel and the secondary information communicated in the metadata stream of the same channel, according to an example embodiment.

FIG. 22 is a block diagram illustrating the primary content 32 communicated in the video stream 327 and the audio stream 329 of a channel 323 and the secondary information 34 communicated in a metadata stream 331 of the same channel 323, according to an example embodiment. The channel 323 is shown to include the video stream 327 communicating the primary content 32, the audio stream 329 communicating the primary content 32, and the metadata stream 331 communicating metadata, a secondary information table 350, and secondary information 34. Responsive to the primary content 32 being rendered to the output device 18 and receipt of a trick mode request, the secondary information table 350 may be accessed by the processing module 322 to identify the location of the secondary information 34 in the metadata stream 331 of the same channel 323.

Figure 23:
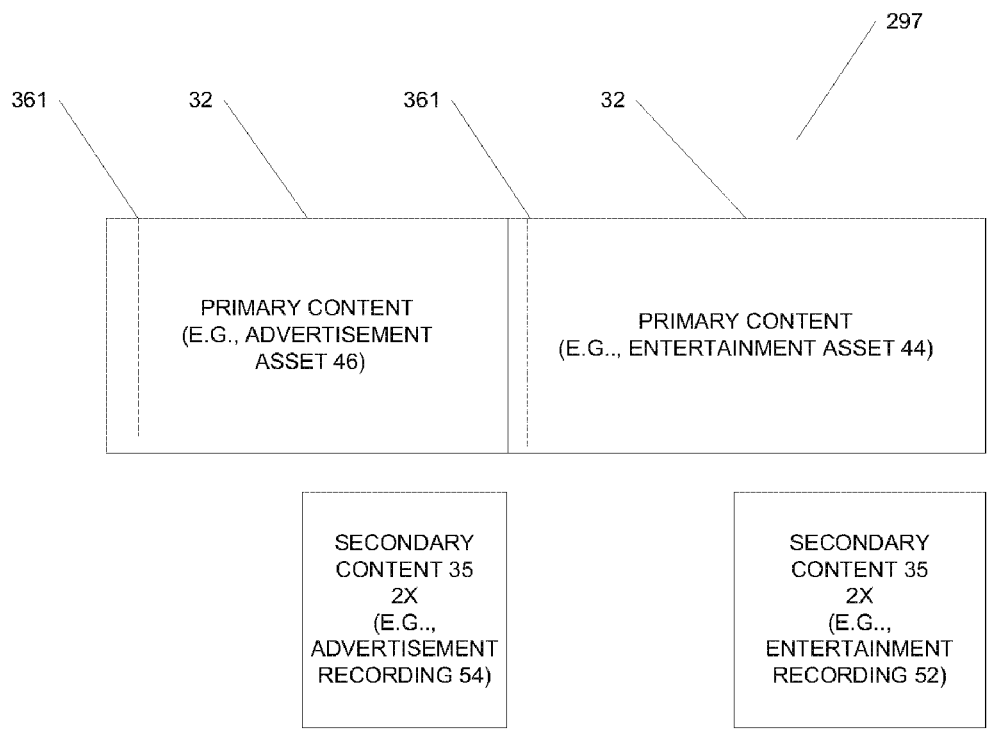
FIG. 23 is a block diagram illustrating end of primary content markers, according to an example embodiment.

FIG. 23 is a block diagram illustrating a transmission 297 including primary content 32 that includes end of primary content markers 361, according to an example embodiment. The transmission 297 is shown to include primary content 32 in the form of an entertainment asset 44 and an advertisement asset 46 and respectively corresponding secondary content 35 in the form of an entertainment recording 52 and an advertisement recording 54. The end of primary content markers 361 may be used by the processing module 322 to identify a location in the primary content 32 to resume play. For example, responsive to receipt of a play request while rendering the entertainment recording 52 to the output device 18, the processing module 322 may skip to the end of primary content marker 361 associated with the entertainment asset 44. Also for example, responsive to receipt of a play request while rendering the advertisement recording 54 to the output device 18, the processing module 322 may skip to the end of primary content marker 361 associated with the advertisement asset 46. Other example embodiments may utilize other forms of secondary content 35 (e.g., advertisement slide show 70 and entertainment slide show 62).

Figure 24:
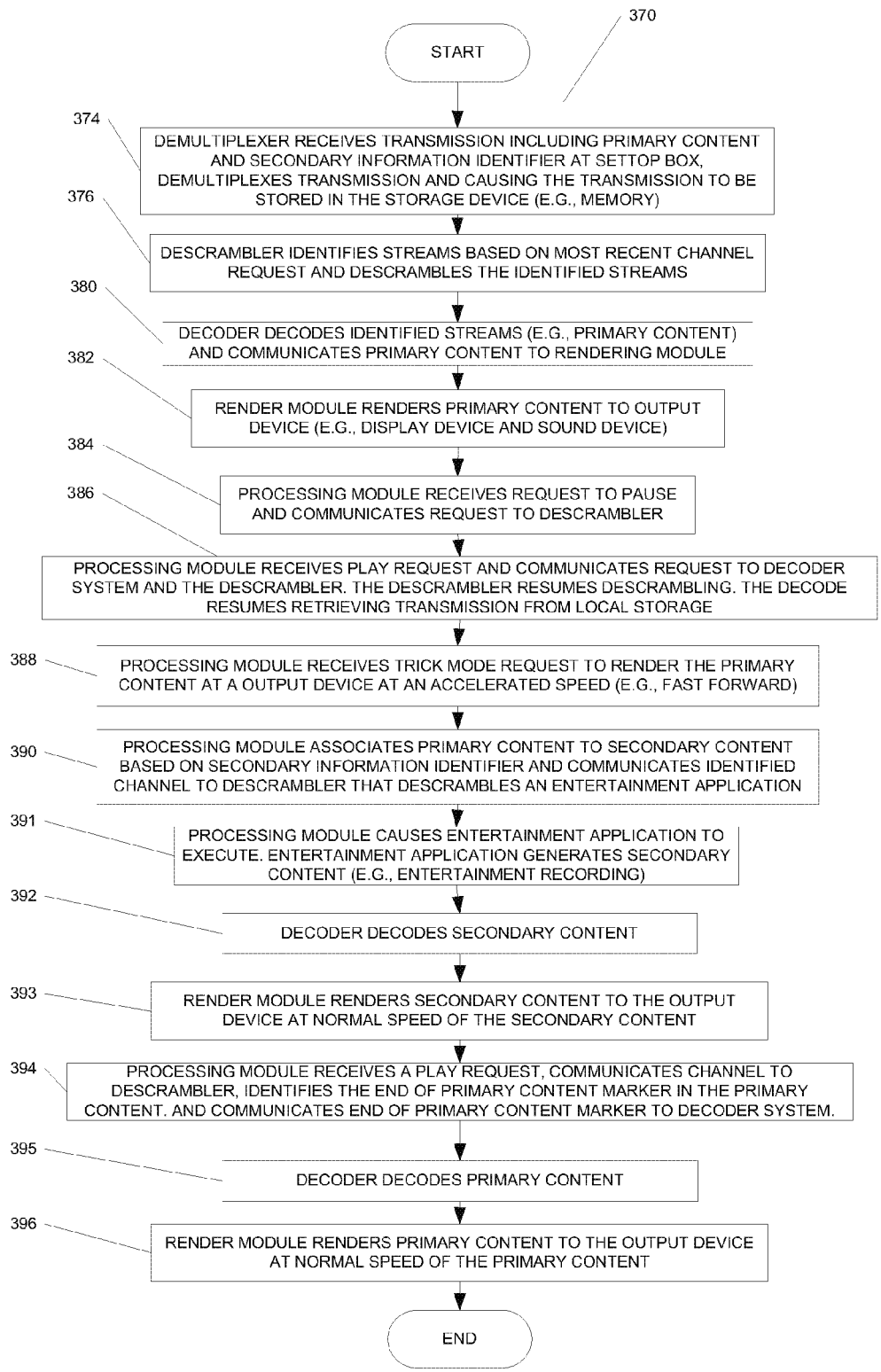
FIG. 24 is flowchart illustrating a method, according to an example embodiment, to modify playback of primary content at a receiving device.

FIG. 24 is flowchart illustrating the method 370, according to an example embodiment, to modify playback of primary content 32 a receiving device 12. The operation 370 commences at operation 374 with the demultiplexer 217 receiving the transmission 297 via the interface 223. The transmission 297 may include primary content 32 and a secondary information table 360 that may include secondary information identifiers 352. The demultiplexer 217 may demultiplex the transmission 297 according to channels 323 and store the demultiplexed transmission 297 as packets 82 in the local storage device 309. For example, the demultiplexer 217 may utilize the audio module 219, the video module 221 and the descrambler 225 to store the demultiplexed transmission 297. Other example embodiments may include a demultiplexer 217 that further depacketizes the transmission 297 and concatenates the payloads 342 to generate frames 86 that may be stored in the local storage device 309.

At operation 376, the descrambler 225 may identify the streams 327, 329, 331 (video, audio, metadata) in the transmission 297 associated with the most recent channel request received at the receiving device 12 and descramble the identified streams 327, 329, 331 based on descrambling information in the metadata stream 331. For example, the user may have requested the channel 323 that carries ESPN (e.g., the ESPN channel). Further, the processor 224, in the decoder system 208, may communicate the descrambled streams 327, 329, 331 to the decoder 230.

At operation 380, the decoder 230 decodes the primary content 32 in the identified streams 327 and communicates the primary content 32 to the render module 234.

At operation 382, the render module 234 renders the primary content 32 to the output device 18 that may include the display device 26 and the sound device 24. For example, the render module 234 may render an entertainment asset 44 (e.g., 2006 World Cup Soccer Game) to the output device 18.

At operation 384, the processing module 322 receives a pause request via the control buttons 19 to pause the rendering of the 2006 World Cup Soccer Game to the output device 18. The processing module 322, in turn, may communicate the request to the descrambler 228 and the decoder system 208. The descrambler 228 stops descrambling packets 82 and the decoder system 208 stops retrieving the descrambled streams from the storage device 309. Accordingly, the demultiplexer 217 continues to store the transmission 297 to the memory 226 with possible overflow to the database 22.

At operation 386, the processing module 322 receives a play request via the control buttons 19. The processing module 322, in turn, may communicate the play request to the decoder system 208 and the descrambler 225. The descrambler 225 may respond by descrambling. The processor 224, in the decoder system 208, in turn, may respond by retrieving or reading the descrambled steams (e.g., transmission 297) from the local storage device 309 that may subsequently be utilized to render primary content 32 to the output device 18 at a normal speed for the primary content 32.

At operation 388, the processing module 322 receives a trick mode request via the remote control 20 to render the primary content 32 at the output device 18 at an accelerated speed. For example, the processing module 322 may receive a request to fast forward the primary content 327 at six-times the normal speed (e.g., 6×FF VERSION).

At operation 390, the processing module 322 may modify the playback of primary content 32 by associating the primary content 32 to the secondary content 35 responsive to receiving the trick mode request. For example, the processing module 322 may retrieve the secondary information table 350 from the metadata stream 331 associated with the channel 323 that carries ESPN (e.g., primary content 32). Further the processing module 322 may identify the secondary information identifier 352 and the secondary information offset 354 in the secondary information table 350 based on the trick mode request (e.g., 6×FF VERSION). In the present example embodiment, the secondary information table 350 may identify the secondary information 34 as located in a video stream 327 and an audio stream 329 of a channel 323 different from the channel 323 that carries ESPN. Accordingly, the processing module 322 may, in an example embodiment, communicate the identified channel 323 to the descrambler 328 that, in turn, processes the corresponding metadata stream 331, video stream 327 and audio stream 329. For example, the descrambler 328 may utilize the descrambling information in the metadata stream 331 to descramble the video stream 327 and audio stream 329. In the present example, the descrambler 328 descrambles secondary information 34 in the form of an entertainment application 68.

At operation 391, the processing module 322 completes the association of primary content 32 to secondary content 35 by causing the entertainment application 68 to execute. The entertainment application 68 executes to generate secondary content 35 in the form of an entertainment recording 52.

At operation 392, the decoder 230 decodes the entertainment recording 52 and communicates the decoded entertainment recording 52 to the render module 234.

At operation 393, the render module 234 may render the entertainment recording 52 to the output device 18 including the display device 26 and the sound device 24 at a normal speed of the entertainment recording 52. For example, the entertainment recording 52 may introduce the players of the teams participating in the 2006 World Cup Soccer Game.

At operation 394, the processing module 322 may receive a play request via the control buttons 19. The processing module 322, in turn, may communicate the ESPN channel 323 to the descrambler 228 that, in turn, descrambles the associated streams 327, 329, 331 based on the identified ESPN channel 323. Next, the processing module 322 identifies the end of primary content marker 361 in the primary content 32 (e.g., 2006 World Cup Soccer Game) and communicates the identified location to the decoder system 206. The processor 224, in the decoder system 208, in turn, communicates the video, audio, and metadata streams 327, 329, 331 that have been identified based on the location to the decoder 230.

At operation 395, the decoder 230 decodes the primary content 32 (e.g., 2006 World Cup Soccer Game).

At operation 396, the render module 234 renders the primary content 21 in the form of the entertainment asset 44 (e.g., 2006 World Cup Soccer Game) to the output device 18.

OTHER EXAMPLE EMBODIMENTS

Location of Secondary Information

The processing module 322 in the above described example embodiment utilized a secondary information identifier 352 to identify a channel 323 in the transmission 297 that carried secondary information 34 in the form of the entertainment application 68. Other example embodiments, however, may identify other locations from which to retrieve the secondary information 34 (e.g., entertainment application 68). For example, the secondary information identifier 352 may further identify the secondary information 34 as located in the audio streams 329 and video stream 327 of the channel 323 that is currently being rendered to the output device 18 (e.g., ESPN channel), the metadata stream 331 of the channel 323 that is currently being rendered to the output device 18, the local storage device 309 or the remote storage device 316.

OTHER EXAMPLE EMBODIMENT

Same Channel

Audio and Video Streams

In this example embodiment the processing module 322 may utilize the secondary information identifier 352 (e.g., stream, stream, channel) to retrieve the secondary information 34 (e.g., entertainment application 68) from the audio stream 329 and the video streams 327 of the ESPN channel 323 responsive to receipt of a trick mode request. Further, the decoder 230 may retrieve the primary content 32 from the audio stream 329 and the video streams 327 in the absence of processing a trick mode request.

OTHER EXAMPLE EMBODIMENT

Same Channel

Metadata Stream

In this example embodiment the processing module 322 may utilize the secondary information identifier 352 (e.g., stream, channel) to retrieve the secondary information 34 (e.g., entertainment application 68) from the metadata stream 331 of the ESPN channel 323 responsive to receipt of a trick mode request. Further, the processing module 322 may retrieve the primary content 32 from metadata stream 331 in the absence of processing a trick mode request.

OTHER EXAMPLE EMBODIMENT

Local Storage Device

In this example embodiment the processing module 322 may utilize the secondary information identifier (e.g., URL) to retrieve the secondary information 34 (e.g., entertainment application 68) from the local storage device 309. Accordingly this example embodiment requires the demultiplexer 217 to retrieve the secondary information 34 (e.g., entertainment application 68) from the transmission 297 and to store the retrieved secondary information 34 in the form of an addressable file on the local storage device 309. It will be appreciated that the secondary information 34 (e.g., entertainment application 68) may be stored on the local storage device 309 asynchronous to receipt of the corresponding primary content 32. For example, as described above, the secondary information 34 (e.g., entertainment application 68) utilized by the processing module 322 to generate the entertainment recording 52 may have been received and stored on the local storage device 309 device three days before the receiving device 12 received the entertainment asset 44 (e.g., 2006 World Cup Soccer Game). Indeed, the secondary information 34 (e.g., entertainment application 68) may be stored on the local storage device 309 any time (e.g., seconds, hours, months, days, etc.) prior to receipt of the corresponding primary content 32.

OTHER EXAMPLE EMBODIMENT

Remote Storage Device

In this example embodiment the processing module 322 may utilize the secondary information identifier (e.g., URL) to retrieve a file from a remote storage device 316 that contains the secondary information 34 (e.g., entertainment application 68). Secondary information 34 may be stored on the remote storage device 316 asynchronous to receipt of the associated primary content 32 at the receiving device 12.

OTHER EXAMPLE EMBODIMENTS

Secondary Information

The processing module 322 in the above described example embodiment associated primary content 32 in the form of an entertainment asset 44 (e.g., 2006 World Cup Soccer Game) to corresponding secondary content 35 in the form of an entertainment recording 52 (e.g., Introduction of the players of the teams participating in the 2006 World Cup Soccer Game). The processing module 322 generated the secondary content 35 by executing the entertainment application 68. Other example embodiments may utilize other types of secondary information 34. For example, other secondary information 34 may include secondary content 35, secondary metadata 58 or a secondary application 60 to generate an entertainment slide show 62.

OTHER EXAMPLE EMBODIMENTS

Secondary Content

The secondary content 35 may include an entertainment recording 52 or an entertainment slide show 62. The processing module 322 may immediately utilize the secondary content 35.

OTHER EXAMPLE EMBODIMENTS

Secondary Metadata

The secondary metadata 58 may include entertainment recording metadata 64 or entertainment slide show metadata 66 that may be utilized by the processing module 322 to generate secondary content 35. For example, the processing module 322 may use the secondary metadata 58 in the form of entertainment recording metadata 64 to identify reference frames 86 reference frame changes 84 in the primary content 32 to generate an entertainment recording 52. In another example the processing module 322 may use the secondary metadata 58 to identify reference frames 86 and add fade-ins and fade-outs to generate an entertainment slide show 62.

OTHER EXAMPLE EMBODIMENTS

Secondary Application

Finally, the secondary application 60 may further be executed by the processing module 322 to generate an entertainment slide show 62.

OTHER EXAMPLES

Advertisement Assets

Further, it will be appreciated by one skilled in the art that primary content 32 may also include an advertisement asset 46. Accordingly, the advertisement asset 46 may be associated to corresponding advertisement secondary information 39 (e.g., advertisement recording 54, advertisement slide show 70, advertisement recording metadata 72, advertisement slide show metadata, advertisement application 76).

OTHER EXAMPLES

Medium and Presentation of Primary and Secondary Content

Other example may include primary content 32 and secondary content 35 that may be embodied in one or more mediums (e.g., visual, audio, kinetic, etc.), the visual medium presented as motion or still. It will be appreciated by one skilled in the art that the medium and presentation of primary content 32 does not necessarily determine the medium and presentation of secondary content 35 and that any combination of the medium and presentation of the primary content 3 may be associated to secondary content in any combination of medium and presentation. For example, primary content 32 embodied solely in audio may be associated with secondary content 35 embodied as audio and visual (e.g., motion or still). In another embodiment, secondary content 35 may include non-derivative secondary content 35 and derivative secondary content 35. For example, secondary content 35 may include video that may be derived from the corresponding primary content 32 and audio that may not be derived from the corresponding primary content 32.

OTHER EXAMPLE

Non-Derivative Secondary Content

In response to the trick mode request, in the above described example embodiment, the processing module 322 generated derivative secondary content (e.g., entertainment recording 52) for rendering to an output device 18 at a normal speed for the derivative secondary content. In another example, the processing module 322 may generate non-derivative secondary content (e.g., advertisement recording 54) for rendering to the output device 18.

OTHER EXAMPLES

Offsets into Primary and Secondary Content

As previously described, in like manner, the author of secondary content 35 may exercise complete editorial control over selection of the offset into the secondary content 35 from which rendering is to begin based on the offset into the primary content 32 that may detected responsive to the trick mode request. It will further be appreciated that the author of secondary metadata 58 and a secondary application 60 may exercise the same editorial control.

OTHER EXAMPLES

Fast Forwarding Past the End of Secondary Content

A user that continues to fast forward after the secondary content 35 (e.g., advertisement) has ended may, in one embodiment, view corresponding primary content 32 that may be rendered at an accelerated speed.

Figure 25:
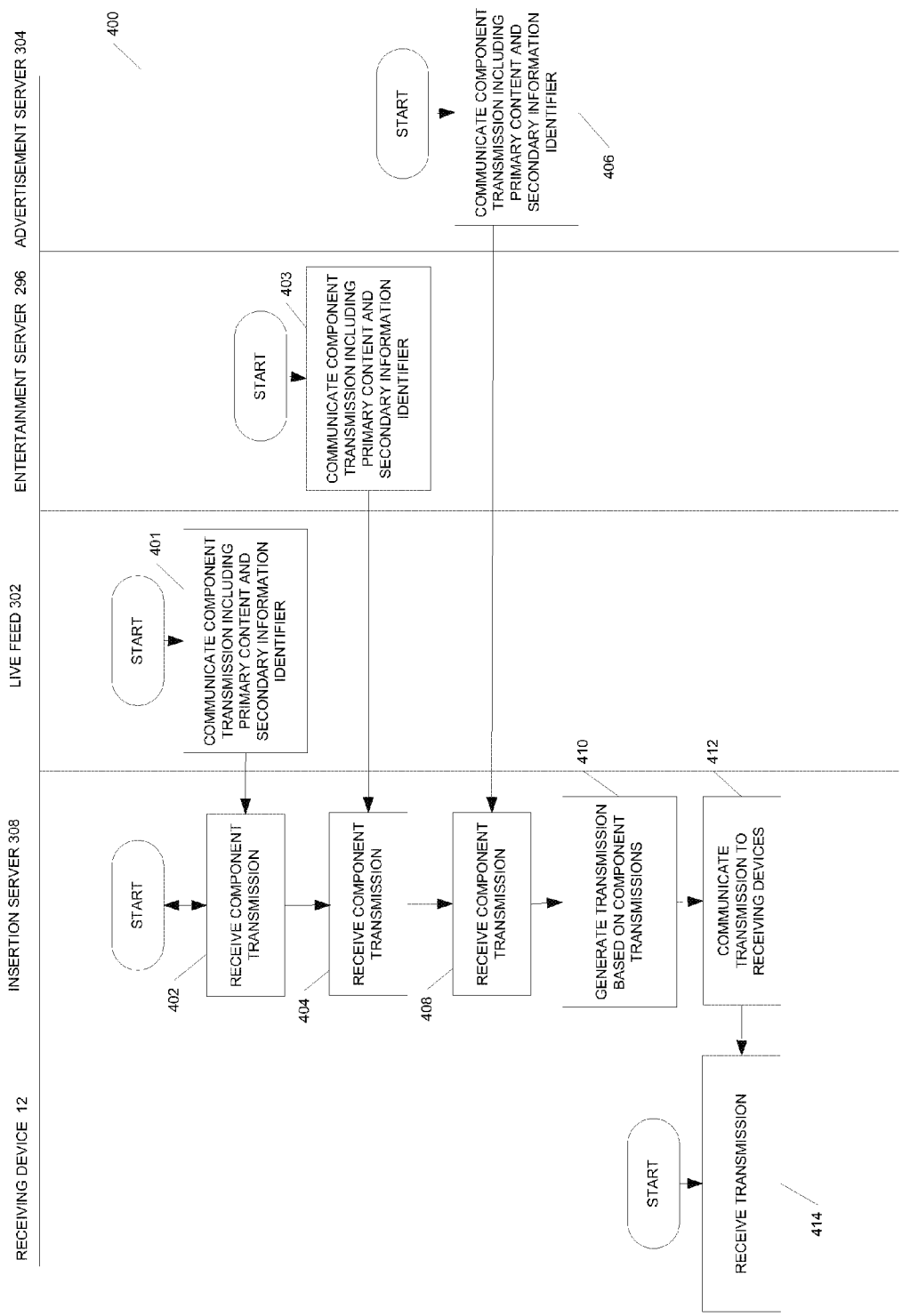
FIG. 25 is a flow chart illustrating a method, according to an example embodiment, to communicate a transmission that facilitates modification of playback of primary content at a receiving device.

FIG. 25 is a flow chart illustrating a method 400, according to an example embodiment, to communicate a transmission 297 that facilitates modification of playback of primary content 32 at a receiving device 12. Illustrated on the far right are operations performed by the advertisement server 304. Illustrated on the center right are operations performed by the entertainment server 296. Illustrated on the center left are operations performed by the insertion server 308. Illustrated on the far left are operations performed by the receiving device 12. Illustrated in the center are operations performed by the live feed 302.

The method 400 commences at operation 401 with the live feed 302 communicating a component transmission 291 to the insertion server 308. The component transmission 291 may include primary content 32 including entertainment assets 44 (e.g., movie, serial episode, documentary, etc.) and advertisement assets 46 (e.g., advertisement, public service announcement, infomercial, etc.). Further, the component transmission 291 may include secondary information 34 including a secondary information table 350. The secondary information table 350 may includes a secondary information identifier 352 that may be utilized to associate the primary content 32 to secondary content 35 or secondary information 34 that may be utilized to generate the secondary content 35.

At operation 402, the transport module 310 at the insertion server 308 may receive the component transmission 291 from the live feed 302.

At operation 403 the entertainment server 296 communicates a component transmission 293 to the insertion server 308. The component transmission 293 may include primary content 32 including entertainment assets 44 (e.g., movie, serial episode, documentary, etc.) and secondary information 34 including a secondary information table 350. The secondary information table 350 may includes a secondary information identifier 352 that may be utilized to associate the primary content 32 to secondary content 35 or secondary information 34 that may be utilized to generate the secondary content 35.

At operation 404, the transport module 310 at the insertion server 308 may receive the component transmission 293 from the entertainment server 296.

At operation 406, the advertisement server 304 communicates a component transmission 295 to the insertion server 308. The component transmission 295 may include primary content 32 including advertisement assets 46 (e.g., advertisement, public service announcement, infomercial, etc.) and secondary information 34 including a secondary information table 350. The secondary information table 350 may include a secondary information identifier 352 that may be utilized to associate the primary content 32 with secondary content 35 or secondary information 34 that may be utilized to generate the secondary content 35.

At operation 408, at the insertion server 308, the transport module 310 may receive the component transmission 295 from the advertisement server 304.

At operation 410, the transport module 310 may generate a transmission 297 based on the component transmissions 293, 295 received from the entertainment server 290 and the advertisement server 304. For example, the transmission 297 may include the primary content 32 and secondary information 34 from the component transmission 293 (e.g., entertainment assets 44 and associated secondary information 34) and the primary content 32 and secondary information 34 from the component transmission 295 (e.g., advertisement assets 46 and associated secondary information 34).

At operation 412, the transmission module 312 communicates the transmission 297 to the receiving device 12.

At operation 414, the receiving device 12 receives the transmission 297. As described above, the processing module 322 at the receiving device 12 may utilize the secondary information identifier 352 in the transmission 297 to associate the primary content 32 to secondary content 35. For example, the primary content 32 may include an entertainment asset 44 that may be associated to secondary content 35 in the form of an entertainment recording 52. Another example may include primary content 32 that may include an advertisement asset 46 that may be associated to secondary content 35 in the form of an advertisement recording 54.

In general, the transmission 297 received from the insertion server 308 may support the association of primary content to secondary content as previously described by the method 370.

Figure 26:
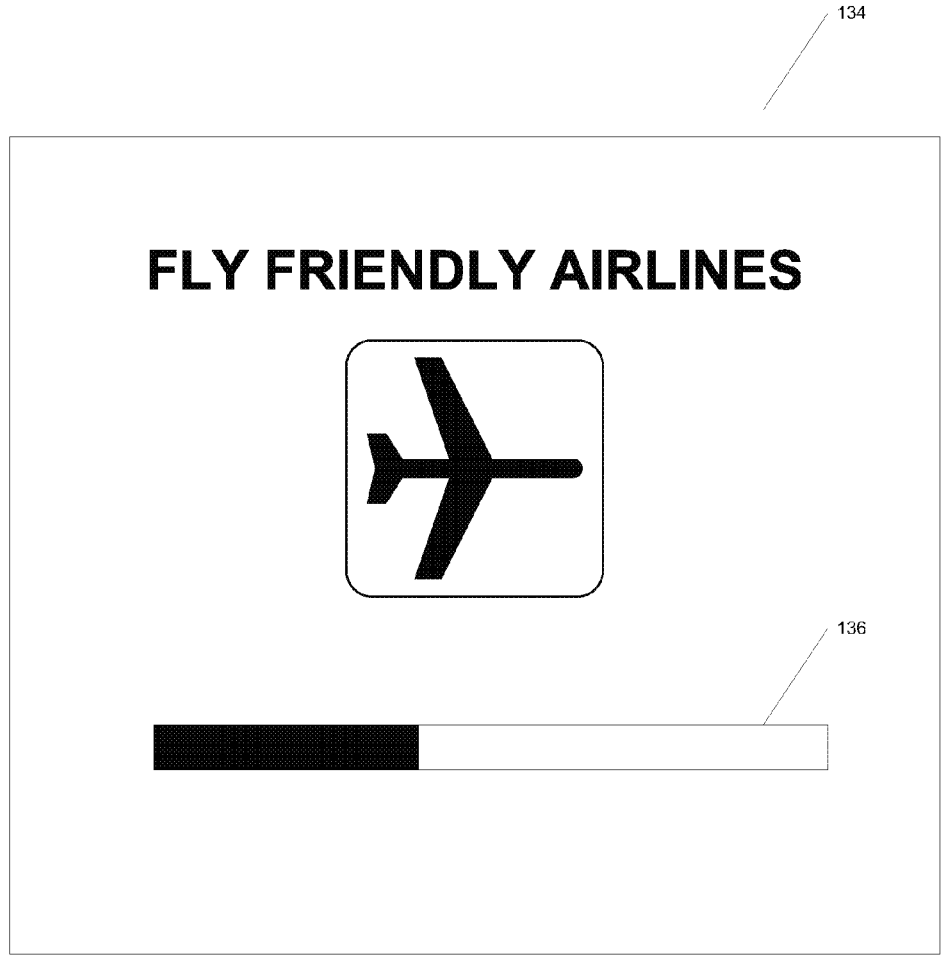
FIG. 26 is a diagram illustrating a user interface, according to an example embodiment.

FIG. 26 is a display device 26 with an image 134, according to an example embodiment, that was rendered from an advertisement recording 54. The image 134 is shown to include a progress bar 136 that provides a visual indication to the user of the amount of time remaining to fast forward the entire advertisement asset 46. Specifically, the progress bar 136 provides the visual indication of the advertisement asset 46 fast forwarding at two-times the normal speed.

Figure 27:
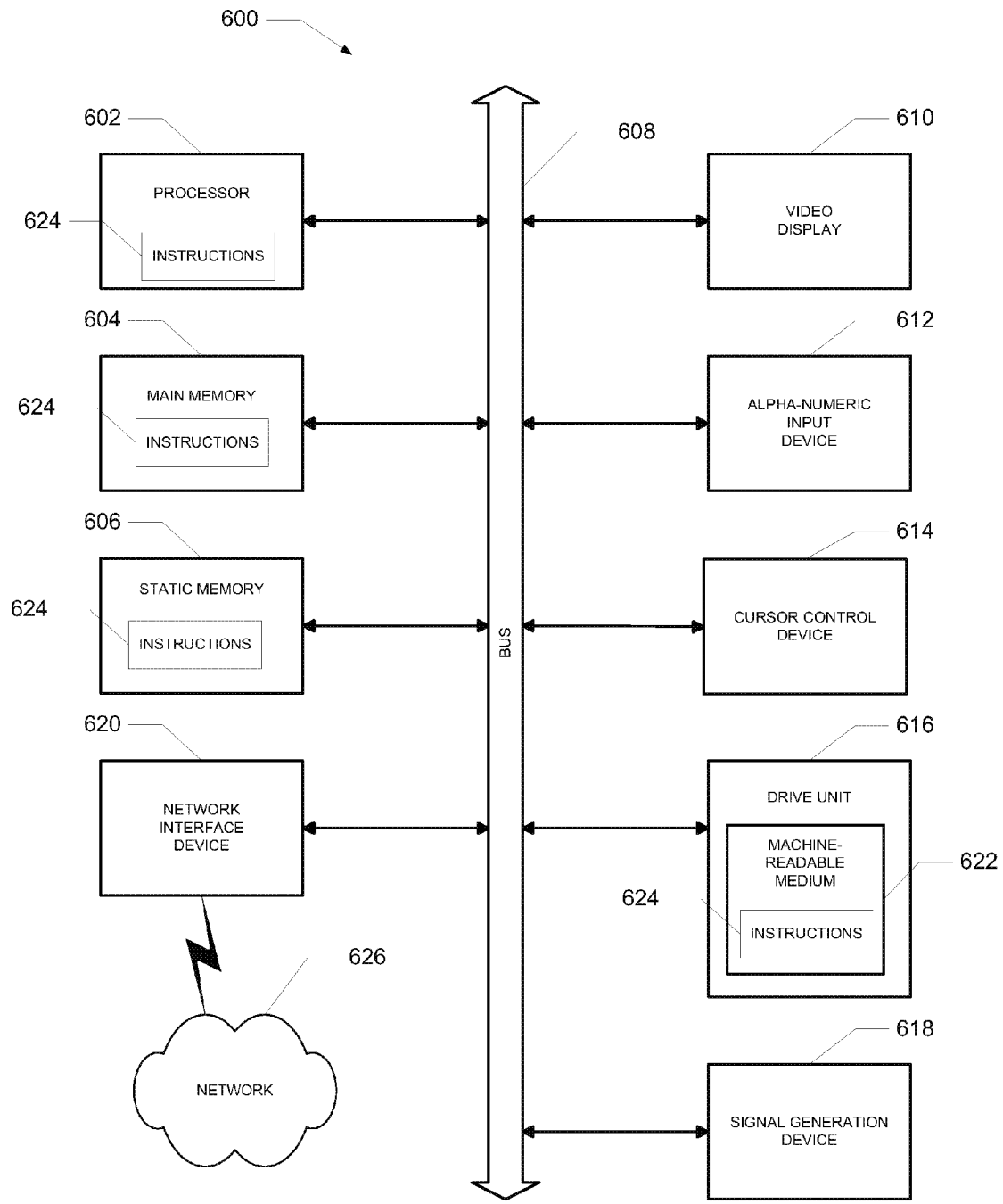
FIG. 27 is a block diagram of a machine, according to an example embodiment, including instructions to perform any one or more of the methodologies described herein.

FIG. 27 shows a diagrammatic representation of a machine in the example form of a computer system 600 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal PrimaryAssistant (PDA), a cellular telephone, a web appliance, a network router, switch or bridge, an iPod, a personal video recorder (PVR) (e.g., analog or digital input), a personal digital recorder (PDR) (e.g., analog or digital input), a mobile phone, a portable media player, a game console or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signal.

Thus, systems and methods to modify playback or playback have been described. Although the present disclosure has been described with reference to specific example embodiments, it will be evident that various modifications and changes may be made to these example embodiments without departing from the broader spirit and scope of the disclosure. Accordingly, the specification and drawings are to be regarded in an illustrative rather than a restrictive sense.

The invention claimed is:

1. A system including:
a request module to receive a request for primary content; and
a communication module to
communicate primary content to a receiving device, the receiving device to render the primary content to an output device at a normal speed of the primary content,
associate the primary content to secondary information,
communicate the secondary information to the receiving device, the receiving device to utilize the secondary information to render secondary non-derivative content to the output device instead of the primary content, the secondary non-derivative content not being derived from the primary content, the receiving device to render the secondary non-derivative content responsive to receipt of a request to render the primary content at the receiving device at an accelerated speed of the primary content.

2. The system of claim 1, wherein the communication module communicates the primary content to the receiving device to store the primary content to a local storage device, the receiving device to retrieve the primary content from the local storage device before the receiving device is to render the primary content to the output device at the normal speed of the primary content.

3. The system of claim 1, wherein the communication module is to associate the primary content to a secondary application that is utilized by the communication module to generate the secondary content.

4. A method including:
receiving a request for primary content;
communicating primary content to a receiving device, the receiving device to render the primary content to an output device at a normal speed of the primary content;
associating the primary content to secondary information; and
communicating the secondary information to the receiving device, the receiving device to utilize the secondary information to render secondary non-derivative content to the output device instead of the primary content, the secondary non-derivative content not being derived from the primary content, the receiving device to render the secondary non-derivative content responsive to receipt of a request to render the primary content at the receiving device at an accelerated speed of the primary content.

5. The method of claim 4, wherein the communicating primary content to the receiving device includes the receiving device to store the primary content to a local storage device and to retrieve the primary content from the local storage device before the receiving device is to render the primary content to an output device at the normal speed of the primary content.

6. The method of claim 4, wherein the request includes a trick mode request and wherein the trick mode request includes any one from a group of trick mode requests including a fast forward request and a rewind request.

7. A tangible machine readable medium storing a set of instructions that, when executed by a machine, cause the machine to:
receive a request for primary content;
communicate primary content to a receiving device, the receiving device to render the primary content to an output device at a normal speed of the primary content;
associate the primary content to secondary information; and
communicate the secondary information to the receiving device, the receiving device to utilize the secondary information to render secondary non-derivative content to the output device instead of the primary content, the secondary non-derivative content not being derived from the primary content, the receiving device to render the secondary non-derivative content responsive to receipt of a request to render the primary content at the receiving device at an accelerated speed of the primary content.

* * * * *